US010699673B2

(12) United States Patent
Tovchigrechko et al.

(10) Patent No.: US 10,699,673 B2
(45) Date of Patent: Jun. 30, 2020

(54) APPARATUS, SYSTEMS, AND METHODS FOR LOCAL DIMMING IN BRIGHTNESS-CONTROLLED ENVIRONMENTS

(71) Applicant: Facebook Technologies, LLC, Menlo Park, CA (US)

(72) Inventors: Andrey Tovchigrechko, Saratoga, CA (US); Vlad Fruchter, Los Altos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/195,837

(22) Filed: Nov. 19, 2018

(65) Prior Publication Data

US 2020/0160812 A1 May 21, 2020

(51) Int. Cl.
*G09G 5/10* (2006.01)

(52) U.S. Cl.
CPC ....... *G09G 5/10* (2013.01); *G09G 2320/0626* (2013.01)

(58) Field of Classification Search
CPC ...................................................... G09G 5/10
USPC .... 345/89, 102, 600, 689, 690, 694; 348/43; 455/566
See application file for complete search history.

(56) References Cited

U.S. PATENT DOCUMENTS

| | | | | |
|---|---|---|---|---|
| 3,357,230 A * | 12/1967 | Topaz | ................... | G03B 43/00 356/243.8 |
| 6,449,089 B1 * | 9/2002 | Moshrefzadeh | ..... | G03B 21/604 359/454 |
| 2007/0222730 A1 * | 9/2007 | Kao | ....... | G09G 3/2059 345/89 |
| 2008/0001910 A1 * | 1/2008 | Lim | ..................... | G09G 3/3406 345/102 |
| 2010/0110098 A1 * | 5/2010 | Wang | .................. | G09G 3/3413 345/589 |
| 2010/0165137 A1 * | 7/2010 | Koishi | ................. | G02B 21/365 348/222.1 |
| 2010/0277515 A1 * | 11/2010 | Ward | ................... | G09G 3/3426 345/690 |
| 2011/0159929 A1 * | 6/2011 | Karaoguz | .......... | H04N 21/4312 455/566 |
| 2011/0175925 A1 * | 7/2011 | Kane | ........................ | G01J 1/42 345/589 |

(Continued)

*Primary Examiner* — Prabodh M Dharia
(74) *Attorney, Agent, or Firm* — FisherBroyles, LLP

(57) ABSTRACT

The disclosed display device may include (1) a display panel including pixel regions, (2) a backlight array coupled to the display panel that includes luminous elements, (3) a display housing configured to substantially prevent a user from referencing external brightness levels, (4) a display driver configured to receive an image including image blocks and scan the image to the display panel, and (5) a backlight driver configured to (a) determine an absolute brightness level of each of the image blocks, (b) derive, for each of the image blocks, a relative brightness level, (c) calculate, for each of the luminous elements, an illumination level based on the relative brightness level of a corresponding portion of the image blocks, and (d) illuminate, while the image is displayed via the display panel, each of the luminous elements according to the illumination level. Various other apparatus, systems, and methods are also disclosed.

20 Claims, 16 Drawing Sheets

(56) References Cited

U.S. PATENT DOCUMENTS

| | | | |
|---|---|---|---|
| 2014/0085245 A1* | 3/2014 | Baldwin | G01J 1/4228 250/206.1 |
| 2014/0218416 A1* | 8/2014 | Suzuki | G09G 5/10 345/690 |
| 2014/0300624 A1* | 10/2014 | Wyatt | G09G 3/342 345/600 |
| 2015/0015668 A1* | 1/2015 | Bennett | G06F 3/14 348/43 |
| 2016/0335948 A1* | 11/2016 | Wen | G09G 3/3426 |
| 2017/0148393 A1* | 5/2017 | Peana | G09G 3/3413 |
| 2017/0164447 A1* | 6/2017 | Rogers | H05B 47/105 |
| 2017/0238062 A1* | 8/2017 | Oh | H04N 7/015 725/116 |
| 2018/0090101 A1* | 3/2018 | Offredi | G09G 3/3618 |
| 2019/0098290 A1* | 3/2019 | Baran | H04N 13/122 |
| 2019/0132577 A1* | 5/2019 | Rowell | H04N 13/246 |
| 2019/0266974 A1* | 8/2019 | Chen | G09G 3/3625 |
| 2019/0287309 A1* | 9/2019 | Samec | G06T 19/006 |

* cited by examiner

APPARATUS, SYSTEMS, AND METHODS FOR LOCAL DIMMING IN BRIGHTNESS-CONTROLLED ENVIRONMENTS

BACKGROUND

Virtual reality (VR) and augmented reality (AR) headsets are gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation-for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Due to the compact size of many virtual and augmented reality headsets, display screens utilized in such headsets may need to have a small profile while also displaying high-quality, high-resolution images. Since a wearer's eyes may be positioned in relatively close proximity to the display screen, which may be further magnified by lenses of the headset, any inconsistencies in a displayed image may be more readily apparent to a headset user than such inconsistencies in other types of display devices. Unfortunately, typical liquid-crystal displays (LCDs), which are sometimes integrated into headsets due to their comparatively lower cost and high availability, may exhibit certain undesirable display artifacts. For example, conventional liquid crystal (LC) panels are often prone to light leakage or "light bleed," which may result in poor contrast ratios and poor black levels. Some LCDs (e.g., large-factor LCDs such as LCD televisions) may employ locally dimmable backlight arrays to enhance contrast ratios and black levels, especially when displaying high-contrast images. Unfortunately, conventional LCDs that use local-dimming capable backlights typically exhibit haloing artifacts, especially around bright objects on darker backgrounds. Moreover, conventional backlights capable of local dimming typically have slower refresh rates than the LC panels they illuminate, which may exacerbate problems with display artifacts. For example, when displayed via conventional LCDs that use local-dimming capable backlights, rapidly moving objects may leave a ghosting trail in their wakes. As a result, a user's experience with conventional LCD headsets may be sub-optimal.

SUMMARY

As will be described in greater detail below, the instant disclosure describes various apparatus, systems, and methods for performing local dimming of backlights in brightness-controlled environments (e.g., VR headsets where a user is substantially prevented from referencing external brightness levels). In some examples, a computer-implemented method may include (1) receiving an image including image blocks, (2) determining an absolute brightness level of each of the image blocks, (3) deriving, for each of the image blocks, a relative brightness level based on an internal reference brightness level, (4) calculating, for each luminous element of a backlight array of a display panel, an illumination level based on the relative brightness level of a corresponding portion of the image blocks, and (5) illuminating, while the image is displayed via the display panel, each of the backlight array's luminous elements according to the illumination level calculated for the luminous element. In some examples, the display panel may include pixel regions, the backlight array may be coupled to the display panel behind the pixel regions and may include the luminous elements each being configured to illuminate a corresponding portion of the pixel regions, and the display panel and the backlight array may be configured to substantially prevent a viewer from referencing external brightness levels.

In some examples, the internal reference brightness level may include the absolute brightness level or the relative brightness level of another one of the image blocks. In one example, the step of deriving the relative brightness level for each of the image blocks may include (1) identifying a first image region of the image including one or more of the image blocks having a lower absolute brightness level, (2) identifying a second image region of the image including one or more of the image blocks having a higher absolute brightness level, (3) calculating a difference between the lower absolute brightness level and the higher absolute brightness level, (4) deriving, for each of the image blocks in the first region, a first relative brightness level that is lower than the lower absolute brightness level, and (5) deriving, for each of the image blocks in the second region, a second relative brightness level that is substantially equal to a sum of the first relative brightness level and the difference.

Additionally or alternatively, the step of deriving the relative brightness level for each of the image blocks may include (1) identifying a first image region of the image having a lower absolute brightness level, (2) identifying a second image region of the image including two or more of the image blocks having a substantially similar higher absolute brightness level, (3) deriving, for the second image region, a brightness level gradient that, when perceived by the viewer, substantially appears as a single brightness level, and (4) assigning brightness levels from the brightness level gradient to the two or more of the image blocks such that image blocks within the second image region furthest from the first image region have highest brightness levels and image blocks within the second image region closest to the first image region have lowest brightness levels. Additionally or alternatively, the step of deriving the relative brightness level for each of the image blocks may include (1) identifying a first image region of the image having a higher absolute brightness level, (2) identifying a second image region of the image including two or more of the image blocks having a substantially similar lower absolute brightness level, (3) deriving, for the second image region, a brightness level gradient that, when perceived by the viewer, substantially appears as a single brightness level, and (4) assigning brightness levels from the brightness level gradient to the two or more of the image blocks such that image blocks within the second image region furthest from the first image region have lowest brightness levels and image blocks within the second image region closest to the first image region have highest brightness levels.

In some examples, the internal reference brightness level may include an absolute brightness level or a relative brightness level of an image block of an additional image previously displayed via the display panel. In some examples, the step of deriving the relative brightness level for each of the image blocks may include (1) identifying an image block of the image having a first absolute brightness level, (2) identifying an image block of the additional image having a second absolute brightness level substantially equal to the first absolute brightness level, (3) determining the relative brightness level of the image block of the additional image, and (4) deriving a relative brightness level for the image block of the image that is lower than the relative brightness level of the image block of the additional image such that a difference between the relative brightness level of the image block of the additional image and the relative brightness level of the image block of the image is substantially imperceptible to the viewer. In some examples, the display panel and the backlight array may form a portion of a head-mounted display device, and the head-mounted display device may include a display housing surrounding the display panel and the backlight array and configured to substantially prevent the viewer from referencing external brightness levels.

A computer-implemented method may include (1) receiving an image to be displayed via a display panel including pixel regions, (2) determining an absolute brightness level of each image block of the image, (3) using a model of human brightness perception to calculate, for each image block of the image, a relative brightness level based of the absolute brightness level or the relative brightness level of another one of the image blocks of the image or an absolute brightness level or a relative brightness level of an image block of an additional image previously displayed via the display panel, (4) calculating, for each luminous element of a backlight array coupled to the display panel behind the pixel regions, an illumination level based on the relative brightness level of a corresponding portion of the image blocks, and (5) illuminating, while the image is displayed via the display panel, each of the luminous elements according to the illumination level calculated for the luminous element. In some examples, each of the backlight array's luminous elements may be configured to illuminate a corresponding portion of the pixel regions, and the display panel and the backlight array may be configured to substantially prevent a viewer from referencing external brightness levels. In some examples, the model of human brightness perception may model how the viewer perceives luminosity gradients. Additionally or alternatively, the model of human brightness perception may model how the viewer perceives absolute brightness levels.

In some examples, the relative brightness level of one of the image blocks may be calculated based on the absolute brightness level or the relative brightness level of another one of the image blocks. In one example, the step of using the model of human brightness perception to calculate the relative brightness level for each of the image blocks may include (1) identifying a first image region of the image including one or more of the image blocks having a lower absolute brightness level, (2) identifying a second image region of the image including one or more of the image blocks having a higher absolute brightness level, (3) calculating a difference between the lower absolute brightness level and the higher absolute brightness level, (4) using the model of human brightness perception to derive, for each of the image blocks in the first region, a first relative brightness level that is lower than the lower absolute brightness level, and (5) deriving, for each of the image blocks in the second region, a second relative brightness level that is substantially equal to a sum of the first relative brightness level and the difference.

In some examples, the step of using the model of human brightness perception to calculate the relative brightness level for each of the image blocks may include (1) identifying a first image region of the image having a lower absolute brightness level, (2) identifying a second image region of the image including two or more of the image blocks having a substantially similar higher absolute brightness level, (3) using the model of human brightness perception to derive, for the second image region, a brightness level gradient that, when perceived by the viewer, substantially appears as a single brightness level, and (4) assigning brightness levels from the brightness level gradient to the two or more of the image blocks such that image blocks within the second image region furthest from the first image region have highest brightness levels and image blocks within the second image region closest to the first image region have lowest brightness levels.

In some examples, the step of using the model of human brightness perception to calculate the relative brightness level for each of the image blocks may include (1) identifying a first image region of the image having a higher absolute brightness level, (2) identifying a second image region of the image including two or more of the image blocks having a substantially similar lower absolute brightness level, (3) using the model of human brightness perception to derive, for the second image region, a brightness level gradient that, when perceived by the viewer, substantially appears as a single brightness level, and (4) assigning brightness levels from the brightness level gradient to the two or more of the image blocks such that image blocks within the second image region furthest from the first image region have lowest brightness levels and image blocks within the second image region closest to the first image region have highest brightness levels.

In some examples, the relative brightness level of one of the image blocks may be calculated based on the absolute brightness level or the relative brightness level of an image block of an additional image previously displayed via the display panel. In some examples, the step of deriving the relative brightness level for each of the image blocks may include (1) identifying image block of the image having a first absolute brightness level, (2) identifying image block of the additional image having a second absolute brightness level substantially equal to the first absolute brightness level, (3) determining the relative brightness level of the image block of the additional image, and (4) using the model of human brightness perception to derive a relative brightness level for the image block of the image that is lower than the relative brightness level of the image block of the additional image such that a difference between the relative brightness level of the image block of the additional image and the relative brightness level of the image block of the image is substantially imperceptible to the viewer.

In addition, a corresponding display device may include (1) a display panel including pixel regions, (2) a backlight array coupled to the display panel behind the pixel regions that includes luminous elements each being configured to illuminate a corresponding one of the pixel regions, (3) a display housing surrounding the display panel and the backlight array and configured to substantially prevent a user from referencing external brightness levels, (4) a display driver configured to receive an image including image blocks and scan the image to the display panel, and (5) a backlight driver configured to (a) determine an absolute brightness level of each of the image blocks, (b) derive, for each of the image blocks, a relative brightness level based of the absolute brightness level or the relative brightness level of another one of the image blocks or an absolute brightness level or a relative brightness level of an image block of an additional image previously displayed via the display panel, (c) calculate, for each of the luminous elements, an illumination level based on the relative brightness level of a corresponding portion of the image blocks, and (d) illuminate, while the image is displayed via the display panel, each of the luminous elements according to the illumination level calculated for the luminous element. In some examples, the relative brightness levels of the image blocks may be derived using a model of human brightness perception configured to model of how the user perceives luminosity gradients or how the user perceives absolute brightness levels. In at least one example, the display device may include a head-mounted display device, and the display panel may include a liquid crystal panel. In some examples, the display device may be a head-mounted display device configured to present an evolving three-dimensional virtual scene to the user, and the image may depict elements in the evolving three-dimensional virtual scene. In such examples, the backlight driver may be further configured to (1) determine a motion of the display device, a head pose of the user relative to the evolving three-dimensional virtual scene, a gaze of the user, and/or one or more of the elements, (2) calculate the illumination level for each of the plurality of luminous elements based on the motion, and/or (3) adjust the image to compensate for the motion before displaying the image to the user via the display panel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
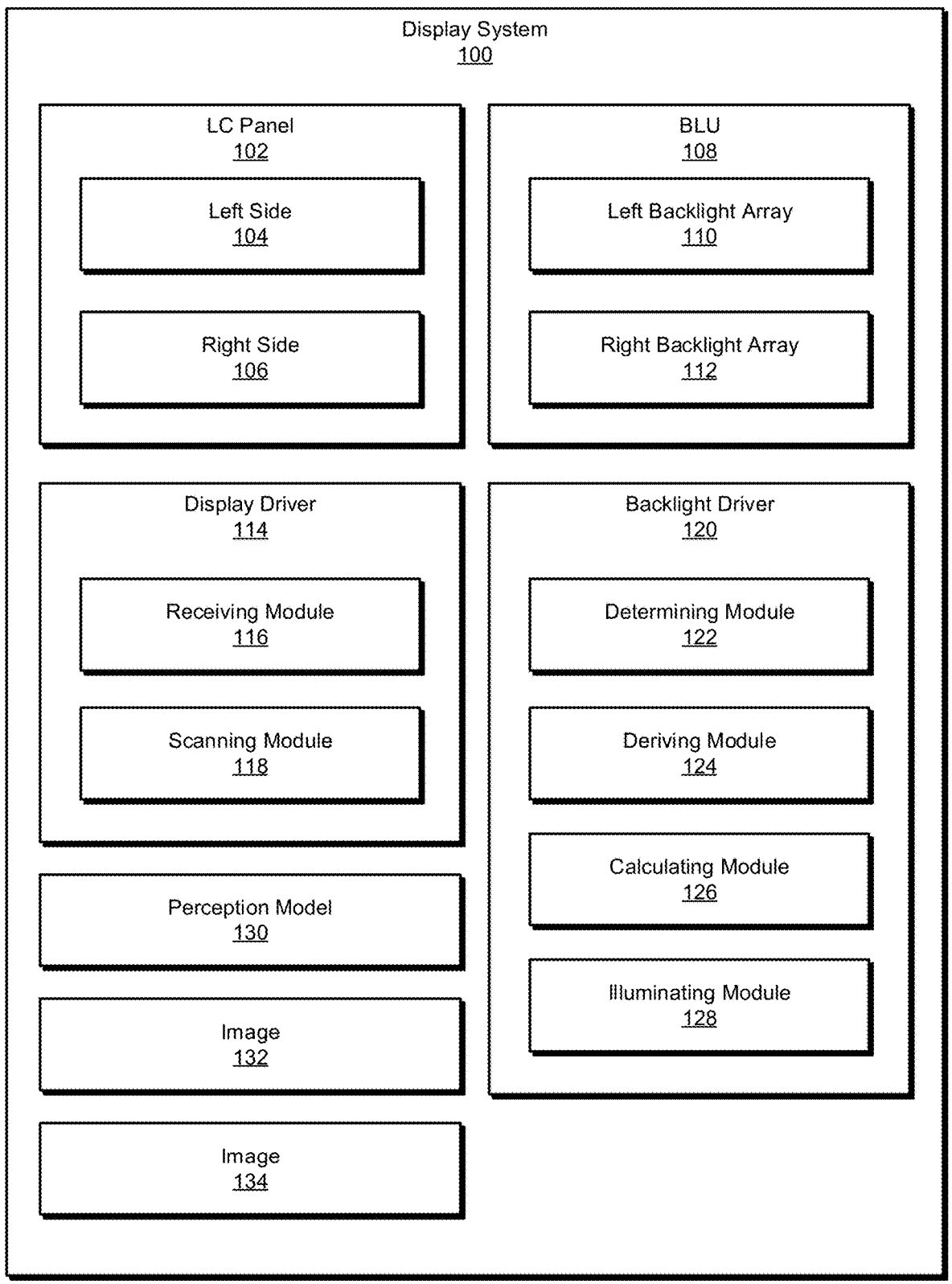
FIG. 1 is a block diagram of an exemplary display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing local dimming in brightness-controlled environments and more specifically directed to systems and methods for local backlight dimming in VR headsets that utilize LCDs. In some examples, embodiments of the instant disclosure may substantially prevent a viewer of a display panel from referencing brightness levels of external light sources (e.g., brightness levels of light sources that do not illuminate the display panel) in order to illuminate the display panel based on relative, rather than absolute, internal brightness levels. In some examples, the disclosed methods may model the specifics of how human eyes and brains work to perceive absolute brightness levels to determine how to illuminate LCDs using various local dimming techniques. Since human vision generally estimates absolute brightness based on relative brightness, the systems and methods disclosed herein may make a portion of an image to appear bright by dimming its surroundings or make a portion of the image to appear dark by making its surroundings brighter. In addition, since human vision is generally able to compensate for illumination gradients and illumination strengths, the systems and methods disclosed herein may use gradient backlighting techniques to variably illuminate portions of an image with substantially the same absolute brightness levels in a way that is imperceptible to users. In some examples, embodiments of the instant disclosure may leverage head position, eye tracking, and/or object motion information available in VR headsets to reduce potential local dimming visual artifacts that might be caused by head, eye, and object movement. By applying the disclosed local backlight dimming techniques to LCDs that fill a user's field of view, the systems and methods disclosed herein may reduce or eliminate many of the visual defects (e.g., static and/or temporal artifacts) found in LCDs that implement conventional local backlighting techniques. Moreover, the disclosed local backlight dimming techniques may enable comfortable observation of fast-moving objects or bright objects on a dark background, reduce power consumption of VR displays, and/or significantly increase the perceived contrast of VR scenes.

The following will provide, with reference to FIGS. 1-5B, examples of head-mounted display systems and devices. In addition, the discussion corresponding to FIGS. 6-16 will provide examples of methods for performing local dimming in brightness-controlled environments.

FIG. 1 is a block diagram of an exemplary display system 100 configured to perform local dimming. As illustrated in this figure, example display system 100 may include an LC panel 102, a backlight unit (BLU) 108, a display driver 114, a backlight driver 120, and a perception model 130. As shown in this example, LC panel 102 may include a left side 104 and a right side 106. Left side 104 and right side 106 may represent a left portion and a right portion of pixel elements of LC panel 102, respectively. When incorporated in a head-mounted display system, left side 104 and right side 106 may represent the portion of LC panel 102 that is visible to a user's left eye and right eye, respectively. BLU 108 may include a plurality of luminous elements or components that generate and emit light. In some examples, BLU may include a left backlight 110 and a right backlight 112. Backlights 110 and 112 may each include, for example, an array of luminous elements (e.g., light-emitting diodes and/or laser emitting diodes).

Display driver 114 may include any suitable circuitry for driving pixel elements of LC panel 102, and backlight driver 120 may include any suitable circuitry for controlling BLU 108. For example, display driver 114 and/or backlight driver 120 may include at least one display driver integrated circuit (IC). In some examples, display driver 114 may include timing controller (TCON) circuitry that receives commands and/or imaging data and generates horizontal and vertical timing signals for thin-film-transistors (TFTs) of LC panel 102. In addition, backlight driver 120 may include circuitry for generating timing and illumination-level signals for backlights 110 and 112. In some embodiments, display driver 114 may be mounted on an edge of a TFT substrate of LC panel 102 and electrically connected to scan lines and data lines of LC panel 102. As illustrated in FIG. 1, display driver 114 and backlight driver 120 may each include one or more modules for performing one or more tasks. As will be explained in greater detail below, display driver 114 may include a receiving module 116 and a scanning module 118, and backlight driver 120 may include a determining module 122, a deriving module 124, a calculating module 126, and an illuminating module 128. Although illustrated as separate elements, one or more of the modules in FIG. 1 may represent portions of a single module or application.

Figure 2:
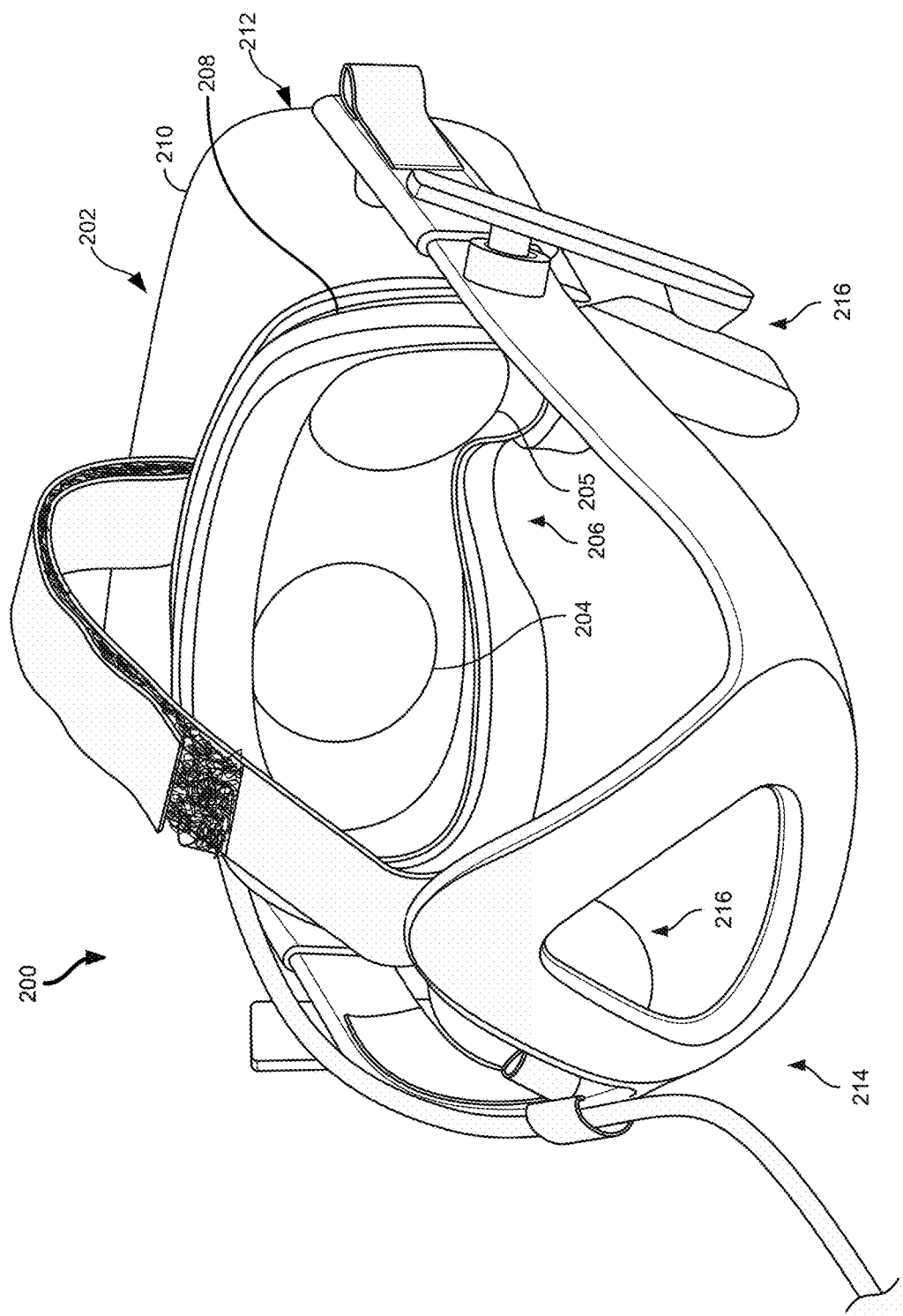
FIG. 2 is a perspective view of an exemplary head-mounted display system in accordance with some embodiments.

Example display system 100 in FIG. 1 may be implemented and/or configured in a variety of ways. For example, as shown in FIG. 2, all or a portion of example display system 100 may represent portions of example head-mounted display system 200. Additionally or alternatively, display system 100 may be utilized in and/or in conjunction with any suitable electronic display device, such as, for example, a television, a computer monitor, a laptop monitor, a tablet device, a portable device, such as a cellular telephone (e.g., a smartphone), a wrist-watch device, a pendant device or other wearable or miniature device, a media player, a camera viewfinder, a gaming device, a navigation device, and/or any other type of device including an electronic display, without limitation.

FIG. 2 is a perspective view of a head-mounted display system 200 in accordance with some embodiments. In some embodiments, head-mounted display system 200 may include a head-mounted-display device 202, a facial-interface system 208, a strap assembly 214, and audio subsystems 216. A head-mounted-display device may include any type or form of display device or system that is worn on or about a user's head and displays visual content to the user. Head-mounted-display devices may display content in any suitable manner, including via a display element (e.g., LC panel 102). Head-mounted-display devices may also display content in one or more of various media formats. For example, a head-mounted-display device may display video, photos, and/or computer-generated imagery (CGI). Head-mounted-display device 202 may include a display housing 210 surrounding various components of head-mounted-display device 202, including lenses 204 and 205 and various electronic components, including LC panels and backlights as described herein. Display housing 210 may include a housing back surface 212 and side surfaces surrounding the internal components, and an opening surrounding a viewing region 206 at a front side of display housing 210.

Head-mounted-display devices may provide diverse and distinctive user experiences. Some head-mounted-display devices may provide virtual-reality experiences (i.e., they may display computer-generated or pre-recorded content), while other head-mounted display devices may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear. Examples of head-mounted-display devices may include OCULUS RIFT, GOOGLE GLASS, HTC VIVE, SAMSUNG GEAR, etc.

In some embodiments, facial-interface system 208 may be configured to comfortably rest against a region of a user's face, including a region surrounding the user's eyes, when head-mounted display system 200 is worn by the user. In these embodiments, facial-interface system 208 may include an interface cushion that is configured to rest against portions of the user's face (e.g., at least a portion of the user's nasal, cheek, temple, and/or forehead facial regions). Facial-interface system 208 may surround viewing region 206, which includes the user's field of vision, allowing the user to look through lenses 204 and 205 of head-mounted-display device 202 without interference from outside light and without referencing external brightness levels while the user is wearing head-mounted display system 200. In at least one example, facial-interface system 208 may include one or more sensors configured to monitor the users gaze (e.g., gaze direction, gaze origin, etc.).

In some embodiments, head-mounted display system 200 may include one or more sensors that generate measurement signals in response to motion of head-mounted display system 200 (e.g., accelerometers, gyroscopes, magnetometers, other suitable types of sensors that detect motion, or some combination thereof). In some examples, head-mounted display system 200 may include a position sensor, an inertial measurement unit (IMU), a depth camera assembly, or any combination thereof. As noted, some artificial reality systems may, instead of blending an artificial reality with actual reality, substantially replace one or more of a user's sensory perceptions of the real world with a virtual experience. In some examples, head-mounted display system 200 may mostly or completely covers a user's field of view.

In some embodiments, head-mounted display system 200 may include various types of computer vision components and subsystems. For example, head-mounted display system 200 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. Head-mounted display system 200 may process data from one or more of these sensors to identify a location of a user, to map the real world, to provide a user with context about real-world surroundings, and/or to perform a variety of other functions (e.g., determine changes to the orientation or position of head-mounted display system 200, a head pose of the user wearing head-mounted display system 200, or a gaze of the user).

In some embodiments, head-mounted display system 200 may map a user's environment and/or track motions of the user within the environment using techniques referred to as "simultaneous location and mapping" (SLAM). SLAM mapping and location identifying techniques may involve a variety of hardware and software tools that can create or update a map of an environment while simultaneously keeping track of a user's location and/or orientation within the mapped environment. SLAM may use many different types of sensors to create a map and determine a user's position within the map. SLAM techniques may, for example, implement optical sensors to determine a user's location. Radios including WiFi, Bluetooth, global positioning system (GPS), cellular or other communication devices may also be used to determine a user's location relative to a radio transceiver or group of transceivers (e.g., a WiFi router or group of GPS satellites). Head-mounted display system 200 may incorporate any or all of these types of sensors to perform SLAM operations such as creating and continually updating maps of a user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

Figure 3:
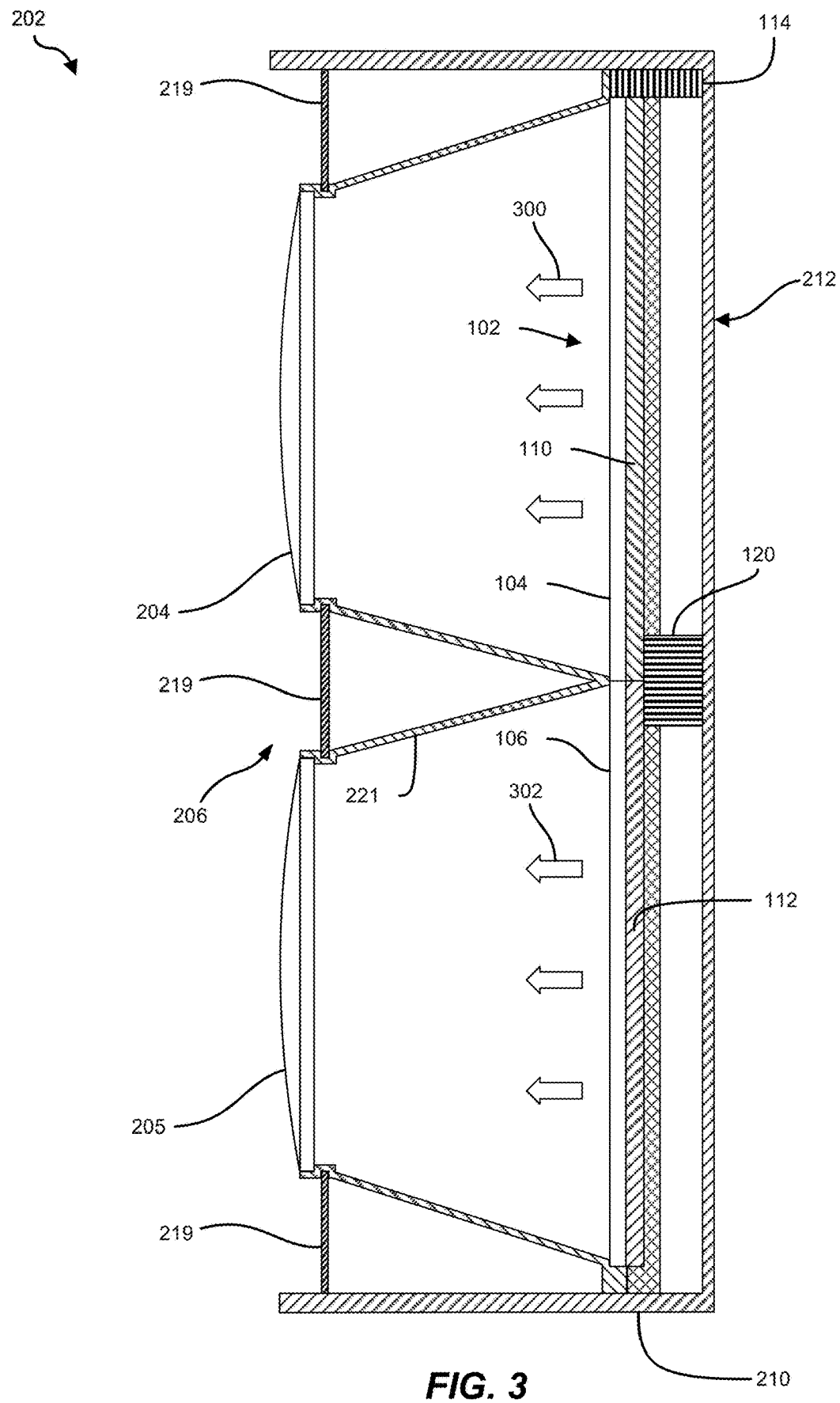
FIG. 3 is a cross-sectional top view of an exemplary head-mounted-display device in accordance with some embodiments.

FIG. 3 shows an exemplary cross-sectional top view of head-mounted-display device 202. As shown in this figure, LC panel 102, BLU 108, display driver 114, and backlight driver 120 may be disposed within display housing 210 of head-mounted-display device 202. LC panel 102 may be disposed within display housing 210 relative to lenses 204 and 205 such that images produced by a display region of LC panel 102 are visible to a user through lenses 204 and 205. As shown, LC panel 102 may be positioned and oriented in display housing 210 such that a front surface of LC panel 102 faces towards lenses 204 and 205. As shown, left backlight 110 may be positioned behind left side 104 of LC panel 102, and right backlight 112 may be positioned behind right side 106 of LC panel 102. As such, light 300 emitted from luminous elements of left backlight 110 through left side 104 of LC panel 102 may be visible to a user's left eye, and light 302 emitted from luminous elements of right backlight 112 through right side 106 of LC panel 102 may be visible to the user's right eye. While not illustrated in FIG. 3, in some embodiments, a light diffuser may be sandwiched between LC panel 102 and BLU 108 in order to diffuse light 300 and light 302.

Figure 4A:
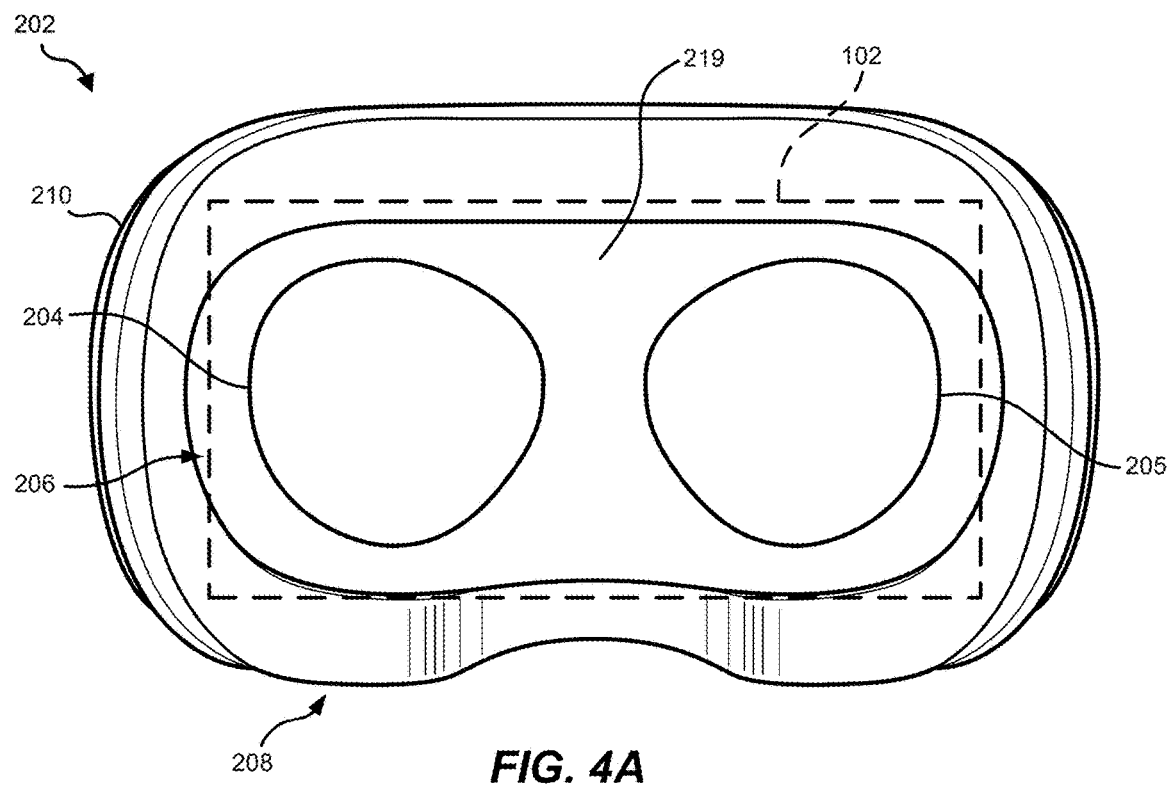
FIG. 4A is a front view of an exemplary head-mounted-display device in accordance with some embodiments.
Figure 4B:
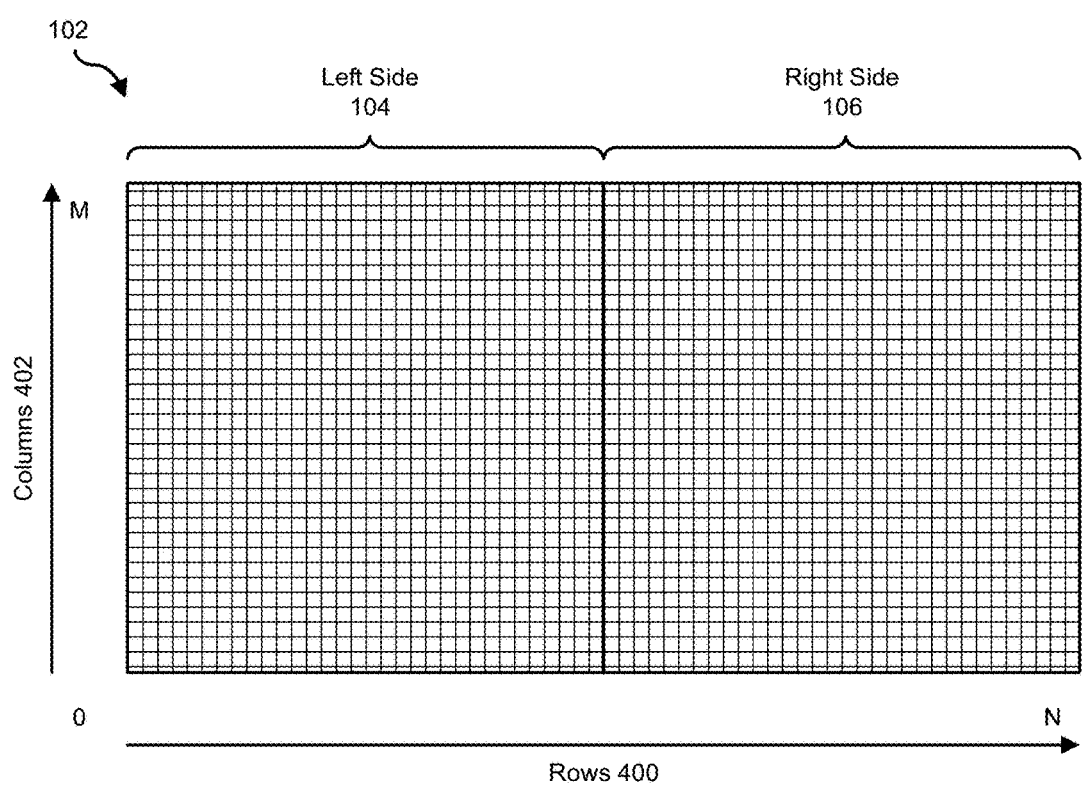
FIG. 4B is a front view of an exemplary LC panel in accordance with some embodiments.

FIGS. 4A and 4B respectively show front views of head-mounted-display device 202 and LC panel 102. As shown in FIG. 4A, head-mounted-display device 202 may include at least one display, such as LC panel 102, disposed within display housing 210. In some embodiments, distinct portions of LC panel 102 may be visible to each of a user's eyes, with portions visible to each eye being separated by a dividing region 221 (e.g., separate eye cups, a central partition, etc.) extending between lenses 204 and 205 and LC panel 102. Such a configuration may enable distinct images to be presented by LC panel 102 to each of the user's eyes, allowing for 3-dimensional images to be perceived by the user.

As shown in FIG. 4A, head-mounted-display device 202 may also include a light-blocking panel 219 surrounding lenses 204 and 205. Light-blocking panel 219 may, for example, extend between lenses 204 and 205 and surrounding portions of display housing 210. Light-blocking panel 219 may include, for example, a light-absorbing material (e.g., a dark polymeric and/or fabric material) that masks internal components of head-mounted-display device 202 and that prevents any outside light incidentally entering viewing region 206 (e.g., through a gap between the user's face and facial-interface system 208) from being reflected within viewing region 206. Display housing 210 may include a rigid material, such as a rigid plastic, that supports and protects internal components, such as LC panel 102, BLU 108, and other electronics.

As shown in FIG. 4B, LC panel 102 may include an M×N array of pixel elements (e.g., pixels and/or sub-pixels) that form visible images according to a suitable LCD technology (e.g., fast switching liquid crystal technology). As shown, LC panel 102 may include M pixel-element columns 402 and N pixel-element rows 400. Each pixel element of LC panel 102 may include LC material that changes states (i.e., orientations of liquid crystals) in response to applied currents or voltages. In some examples, images may be displayed via LC panel 102 by driving pixel elements at different currents and/or voltages such that the pixel elements' LC material takes on different states and different amounts of polarization is given to light emitted through each of the pixel elements. A wide variety of visible colors may be produced by combining different amounts of light passed through sub-pixel color regions (e.g., red, green, and/or blue color regions) of a color filter array panel such that a user perceives colors corresponding to the combinations of the sub-pixel colors.

In some embodiments, display driver 114 may display an image via LC panel 102 by sending corresponding input signals to each of rows 400 of LC panel 102, with the input signals being sequentially scanned along rows 400 from row 0 to row N. These input signals may set LC material at each of rows 400 to new states suitable for displaying the image. Backlight driver 120 may initiate an illumination of a portion of rows 400 after its LC material has completely transitioned to the new states as described below. For example, backlight driver 120 may initiate an illumination of backlight 110 to illuminate left side 104 after its LC material has completely transitioned and may initiate an illumination of backlight 112 to illuminate right side 106 after its LC material has completely transitioned.

Figures 5A, 5B:
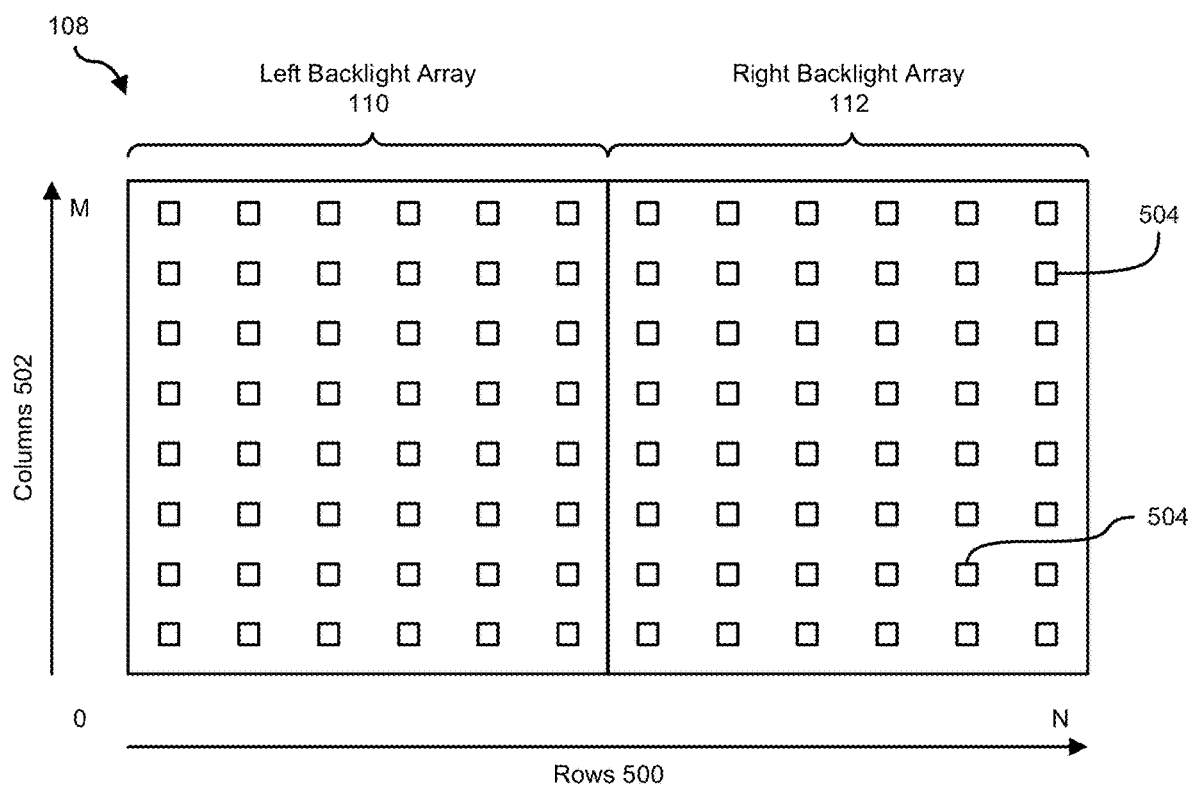
FIG. 5A is a front view of an exemplary backlight array in accordance with some embodiments.
FIG. 5B is a perspective view of a portion of the exemplary LC panel illustrated in FIG. 4B and a corresponding portion of the exemplary backlight array illustrated in FIG. 5A in accordance with some embodiments.

As shown in FIG. 5A, BLU 108 may include an M×N array of luminous elements 504 that each emit light at variable intensities. As shown, BLU 108 may include M luminous-element columns 502 and N luminous-element rows 500. As shown in FIG. 5B, each of luminous elements 504 of BLU 108 may be configured to illuminate a corresponding zone 508 of the pixel elements of LC panel 102. In some examples, a light diffuser 506 may be sandwiched between LC panel 102 and BLU 108 to diffuse the light emitted by a single luminous element 504 across its corresponding zone 508. In general, LC panel 102 may be a higher resolution panel, and BLU may be a lower resolution panel.

Figure 6:
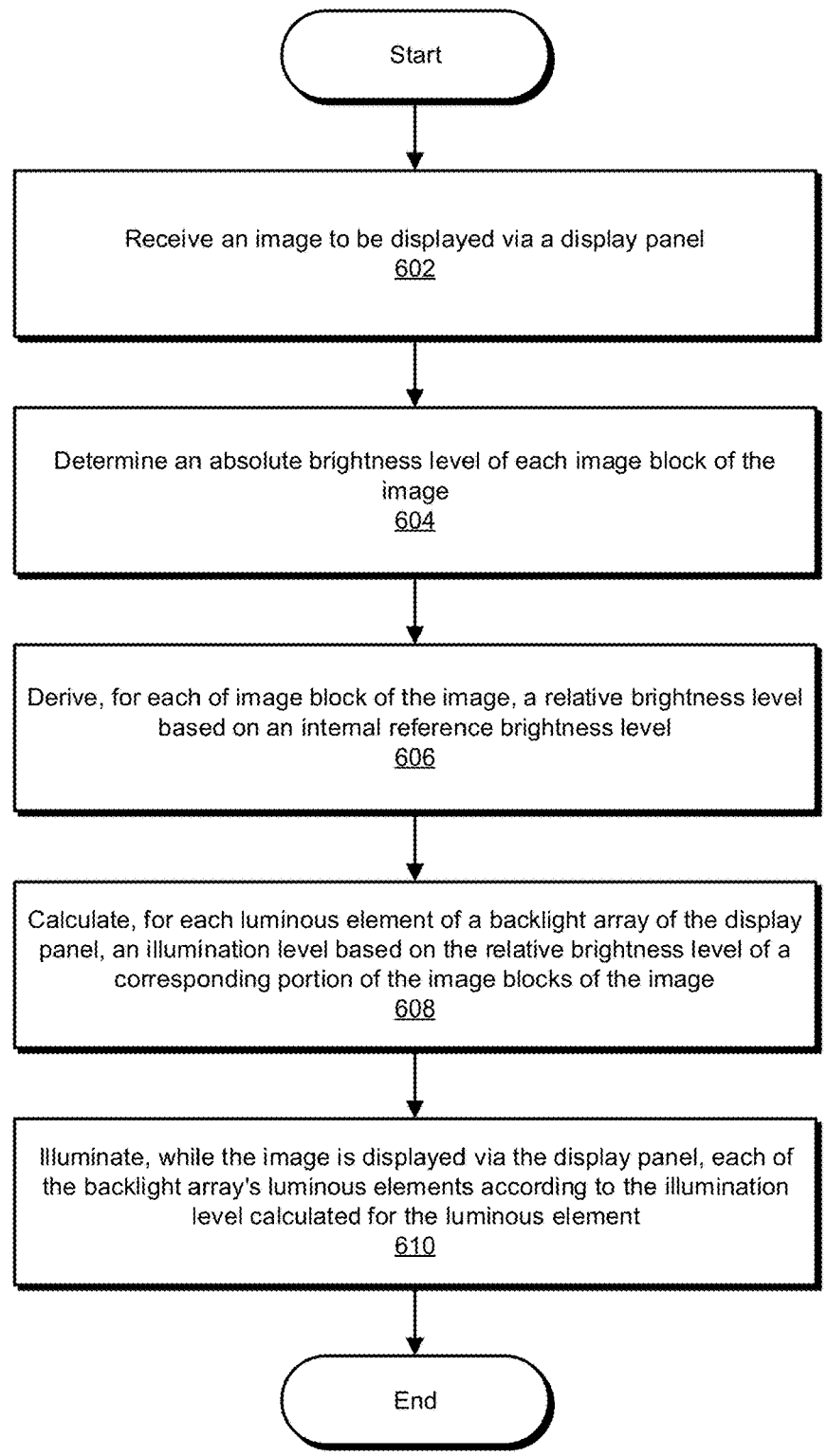
FIG. 6 is a flow diagram of an exemplary method for performing local dimming of backlights in brightness-controlled environments in accordance with some embodiments.

FIG. 6 is a flow diagram of an example computer-implemented method 600 for performing local dimming of backlights in brightness-controlled environments. The steps shown in FIG. 6 may be performed by any suitable computer-executable code and/or computing system, including display system 100 in FIG. 1, head-mounted-display device 202 in FIG. 2, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 602, one or more of the apparatus or systems described herein may receive an image to be displayed via a display panel. For example, receiving module 116 may, as part of display driver 114, receive image 132 to be displayed via LC panel 102. In general, the apparatus or systems described herein may receive series of images (e.g., a sequence of video frames) to display to a user via a display panel.

At step 604, one or more of the apparatus or systems described herein may determine an absolute brightness level of each image block of the image. For example, determining module 122 may, as part of backlight driver 120, determine an absolute brightness level of each image block of image 132. In some examples, the term "image block" may refer to individual pixels of an image. In other examples, the term "image block" may refer to a portion of a display panel that is illuminated by a single luminous element of a backlight array. In some examples, the term "absolute brightness level" may refer to a grayscale value, a lightness value, or luminance value of any portion of an image. In some examples, the term "absolute brightness level" may refer to a grayscale value or luminance value of a pixel of an image. Additionally or alternatively, the term "absolute brightness level" may refer to a digital representation of relative luminance in a particular color space.

At step 606, one or more of the apparatus or systems described herein may derive, for each image block of the image, a relative brightness level based on an internal reference brightness level. For example, deriving module 124 may, as part of backlight driver 120, derive, for each image block of image 132, a relative brightness level based on a particular predetermined internal reference brightness level. In some examples, the term "relative brightness level" may refer to a brightness level of any portion of an image that is relative to a reference brightness level. In some examples, the term "relative brightness level" may refer to a brightness level perceived by a viewer (e.g., a perceived grayscale value, lightness value, or luminance value of a pixel of an image when viewed next to another reference grayscale value, lightness value, or luminance value). In some examples, the apparatus or systems described herein may transform the image received at step 602 into a corrected image that is more suitable for display via a backlit LCD display by adjusting the absolute brightness levels of the image received at step 602 based on the derived relative brightness levels of its image blocks such that the differences between the absolute brightness levels of the image blocks of the image received at step 602 and the absolute brightness levels of the corresponding image blocks of the corrected image are imperceptible to an observer. As such, one or more users may be unable to tell the difference between the image received at step 602 and the corrected image (e.g., if observed in a closed environment without seeing other external objects).

The apparatus or systems described herein may use a variety of internal reference brightness levels to derive relative brightness levels. Examples of internal reference brightness levels may include, without limitation, the absolute brightness level of one or more image blocks of an image, the relative brightness level of another one of the image blocks, the absolute brightness level of one or more image blocks of a previously displayed image, and/or the relative brightness level of one or more image blocks of a previously displayed image.

Figure 7:
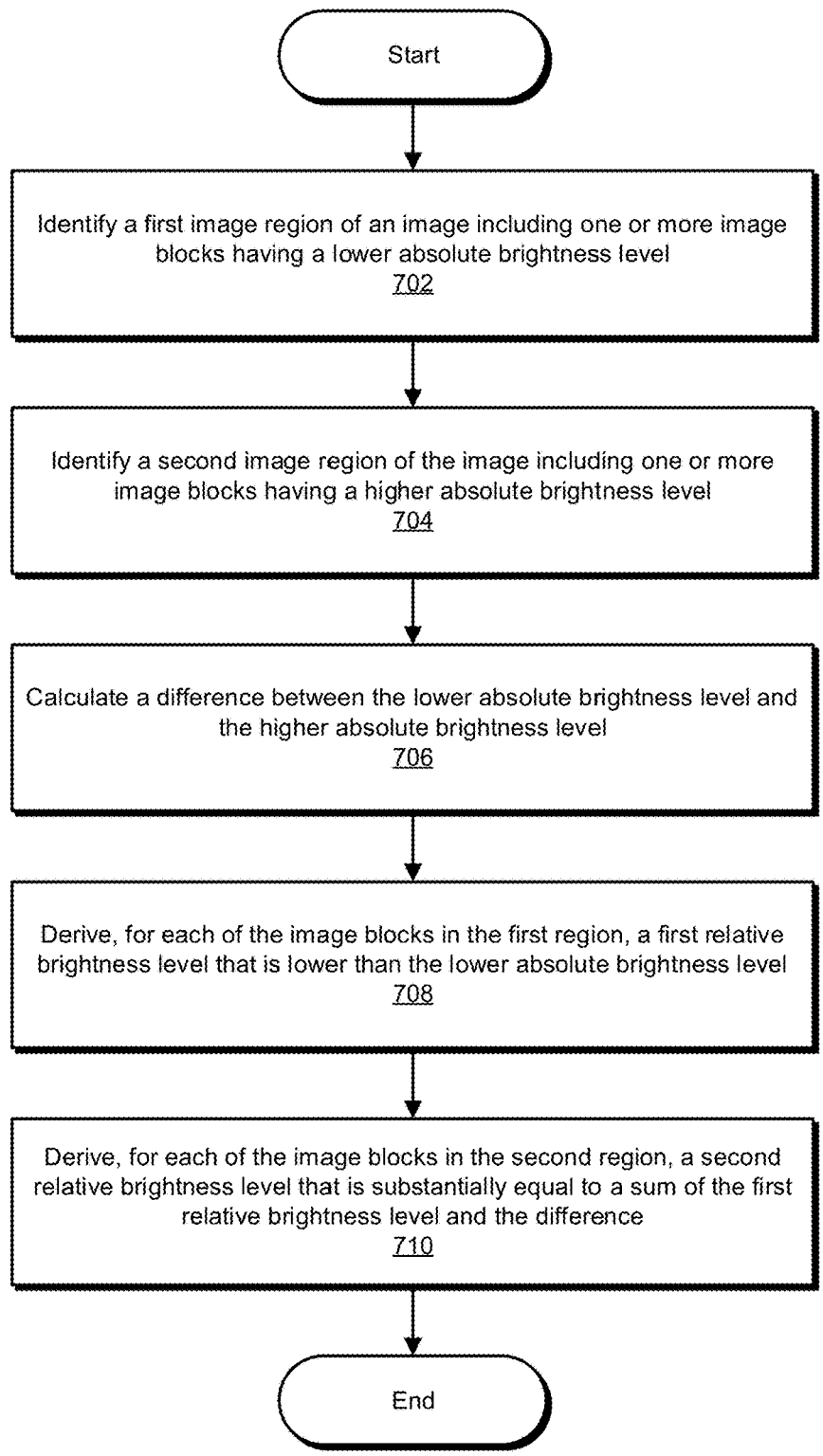
FIG. 7 is a flow diagram of an exemplary method for deriving relative brightness levels in accordance with some embodiments.
Figure 8A:
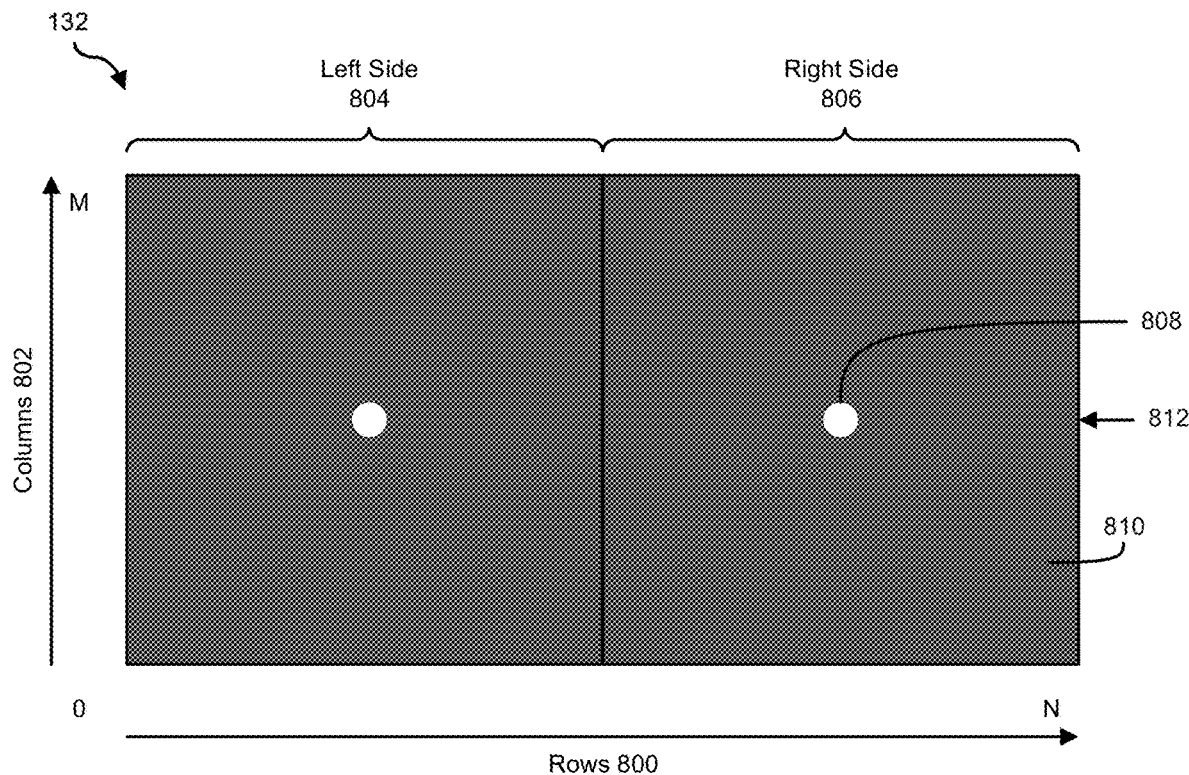
FIG. 8A is a front view of an exemplary image in accordance with some embodiments.
Figure 8B:
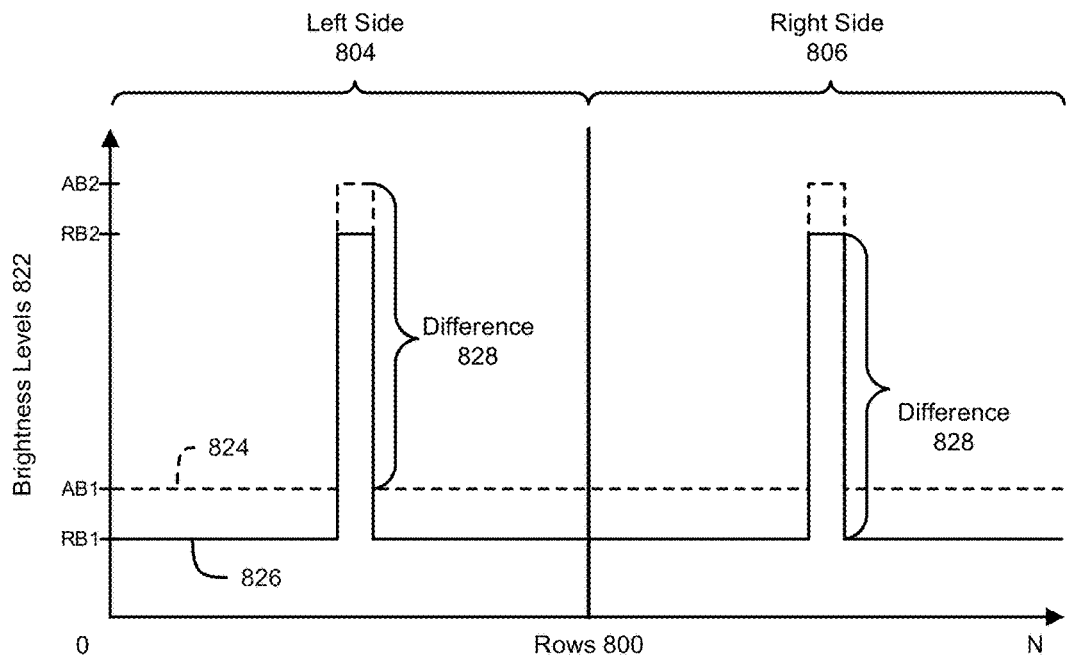
FIG. 8B is a diagram of exemplary absolute and relative brightness levels corresponding to the exemplary image illustrated in FIG. 8A in accordance with some embodiments.

FIG. 7 illustrates an exemplary method for deriving relative brightness levels for pixels of image 132, illustrated in FIG. 8A. In this example, image 132 may include M pixel columns 802 and N pixel rows 800 and may include a left side 804 for display via left side 104 of LC panel 102 and a right side 806 for display via right side 106 of LC panel 102. As shown in FIG. 7, at step 702, the apparatus or systems described herein may identify a first image region of an image including one or more image blocks having a lower absolute brightness level. For example, deriving module 124 may identify image region 810 of image 132 illustrated in FIG. 8A that includes image blocks having an absolute brightness level equal to AB1 shown in FIG. 8B, which illustrates brightness levels 822 of the pixels in column 812 of image 132. In the example shown in FIG. 8B, line 824 may represent the absolute brightness levels of pixels in column 812 of image 132, and line 826 may represent derived relative brightness levels for pixels in column 812 of image 132.

At step 704, the apparatus or systems described herein may identify a second image region of the image including one or more of the image blocks having a higher absolute brightness level. For example, deriving module 124 may identify image region 808 of image 132 illustrated in FIG. 8A that includes image blocks having an absolute brightness level equal to AB2. At step 706, the apparatus or systems described herein may calculate a difference between the lower absolute brightness level and the higher absolute brightness level. For example, deriving module 124 may calculate a difference 828 between AB1 and AB2. At step 708, the apparatus or systems described herein may derive, for each of the image blocks in the first region, a first relative brightness level that is lower than the lower absolute brightness level. For example, deriving module 124 may derive, for each of the image blocks in region 810, a relative brightness level that is equal to RB1. In general, the apparatus or systems described herein may choose a value for the first relative brightness level such that there is little to no perceptible difference between the first relative brightness level and the lower absolute brightness level. At step 710, the apparatus or systems described herein may derive, for each of the image blocks in the second region, a second relative brightness level that is substantially equal to a sum of the first relative brightness level and the difference. For example, deriving module 124 may derive, for each of the image blocks in region 808, a relative brightness level that is equal to RB2 (i.e., the sum of RB1 and difference 828).

Figure 9:
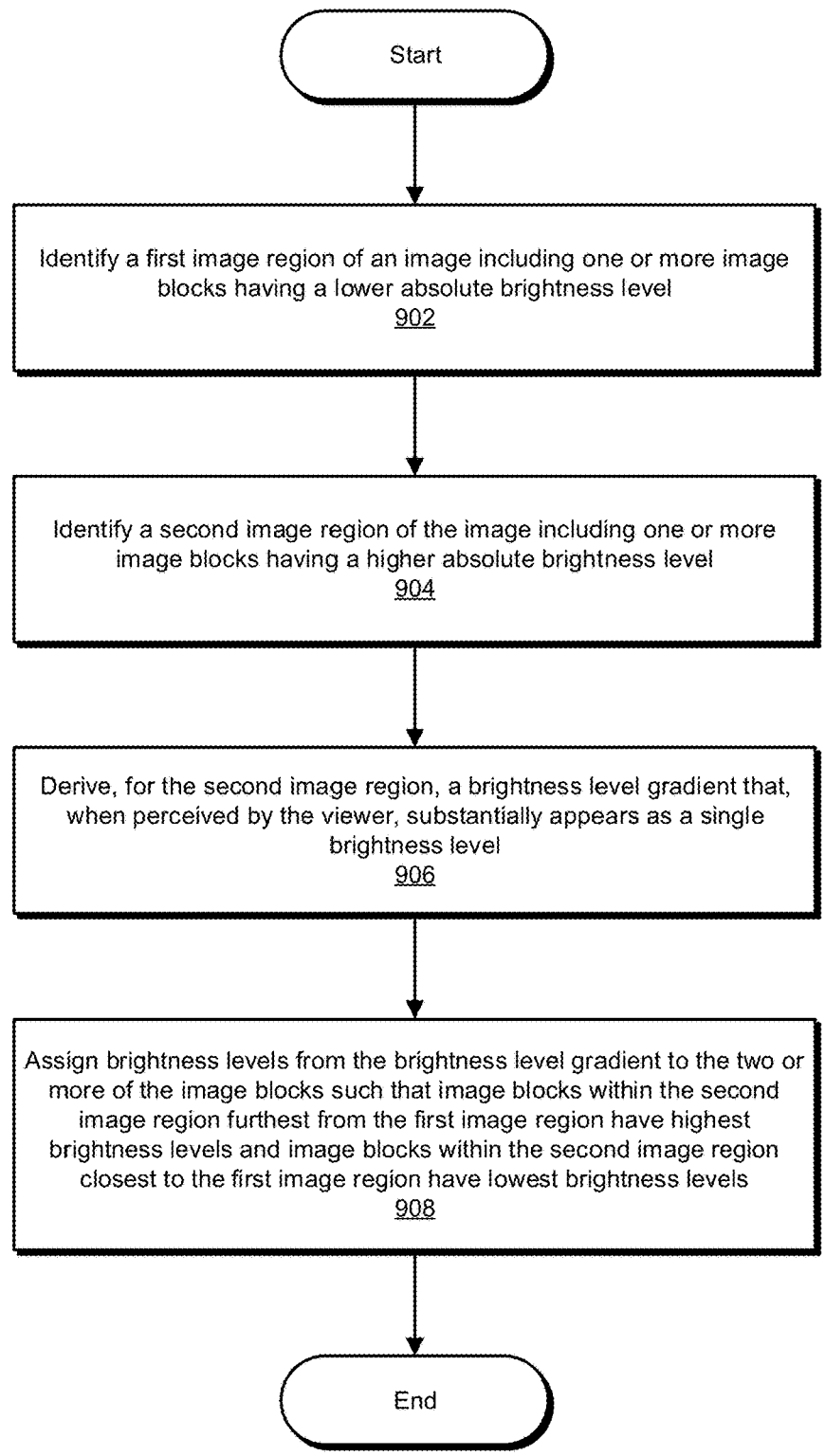
FIG. 9 is a flow diagram of an exemplary method for deriving relative brightness levels in accordance with some embodiments.
Figure 10A:
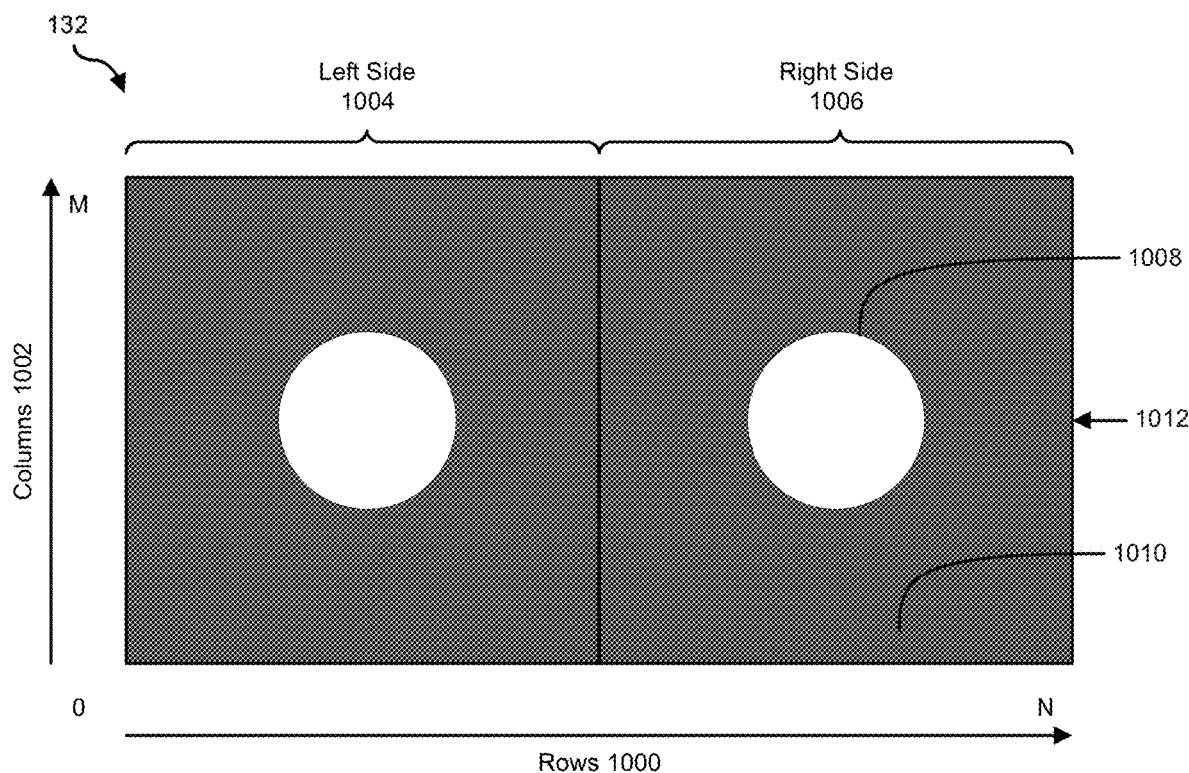
FIG. 10A is a front view of an additional exemplary image in accordance with some embodiments.
Figure 10B:
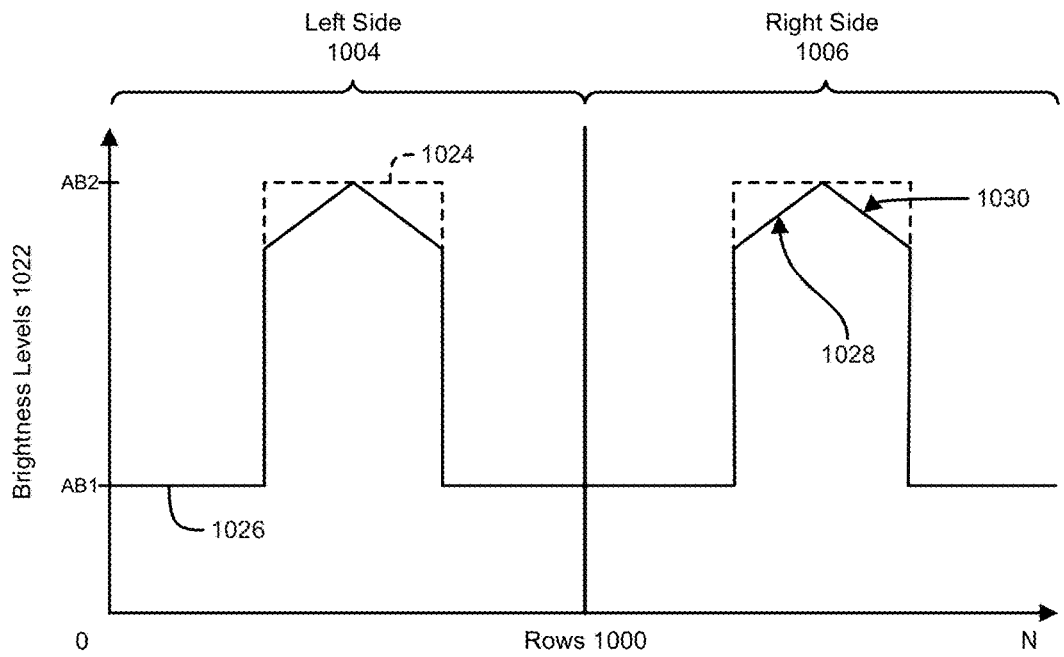
FIG. 10B is a diagram of exemplary absolute and relative brightness levels corresponding to the additional exemplary image illustrated in FIG. 10A in accordance with some embodiments.
Figure 11:
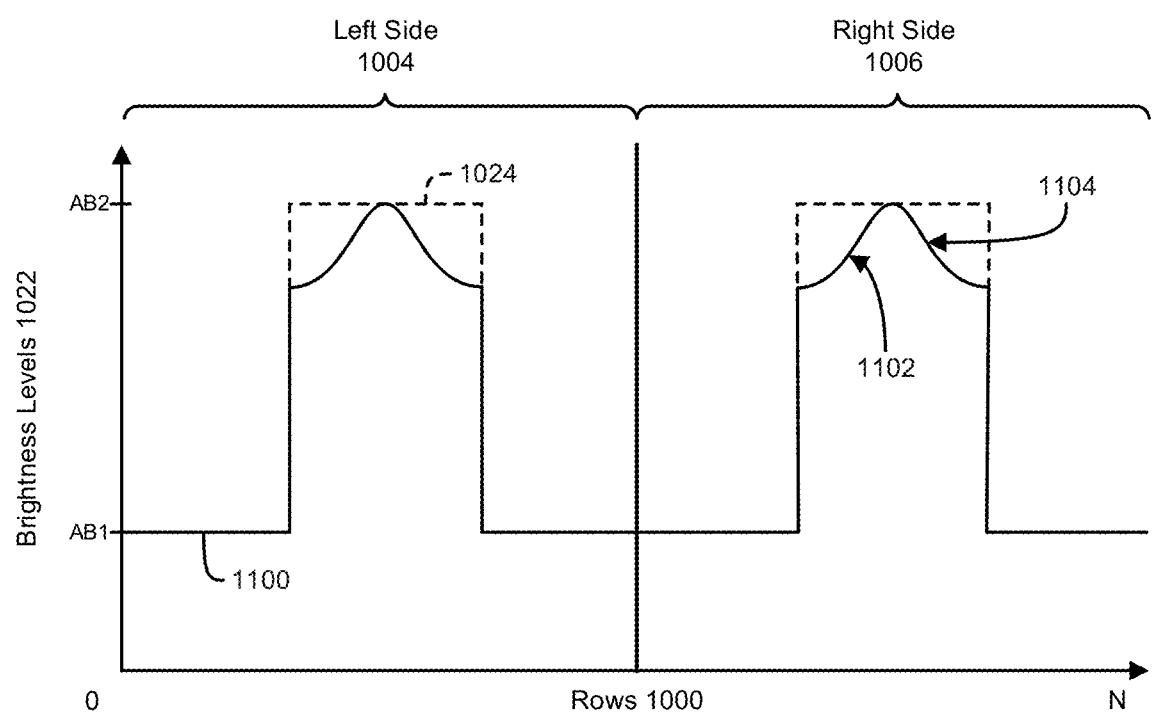
FIG. 11 is a diagram of additional exemplary absolute and relative brightness levels corresponding to the additional exemplary image illustrated in FIG. 10A in accordance with some embodiments.

FIG. 9 illustrates an exemplary method for deriving relative brightness levels for pixels of image 132 illustrated in FIG. 10A. In this example, image 132 may include M pixel columns 1002 and N pixel rows 1000 and may include a left side 1004 for display via left side 104 of LC panel 102 and a right side 1006 for display via right side 106 of LC panel 102. As shown in FIG. 9, at step 902, the apparatus or systems described herein may identify a first image region of an image including one or more image blocks having a lower absolute brightness level. For example, deriving module 124 may identify image region 1010 of image 132 illustrated in FIG. 10A that includes pixels having an absolute brightness level equal to AB1 shown in FIG. 10B, which illustrates brightness levels 1022 of the pixels in column 1012 of image 132. In the example shown in FIG. 10B, line 1024 may represent the absolute brightness levels of the pixels in column 1012 of image 132, and line 1026 may represent derived relative brightness levels for the pixels in column 1012 of image 132.

At step 904, the apparatus or systems described herein may identify a second image region of the image including one or more of the image blocks having a higher absolute brightness level. For example, deriving module 124 may identify image region 1008 of image 132 illustrated in FIG. 10A that includes pixels having an absolute brightness level equal to AB2. At step 906, the apparatus or systems described herein may derive, for the second image region, a brightness level gradient (e.g., a series of brightness levels that gradually increase or decrease) that, when perceived by a viewer, substantially appears as a single brightness level. For example, deriving module 124 may derive, for image region 1008, a brightness level gradient 1028 and a brightness level gradient 1030 that, when perceived by a viewer, substantially appears as brightness level AB2. In another example, deriving module 124 may derive, for image region 1008, a brightness level gradient 1102 and a brightness level gradient 1104 illustrated in FIG. 11 that, when perceived by a viewer, substantially appears as brightness level AB2. At step 908, the apparatus or systems described herein may assign brightness levels from the brightness level gradient to the two or more of the image blocks such that image blocks within the second image region furthest from the first image region have highest brightness levels and image blocks within the second image region closest to the first image region have lowest brightness. For example, deriving module 124 may assign brightness levels from brightness level gradients 1028 and 1030 to pixels along column 1012 corresponding to image region 1008 as shown such that pixels within image region 1008 furthest from image region 1010 have highest brightness levels and pixels within image region 1008 closest to image region 1010 have lowest brightness levels.

Figure 12:
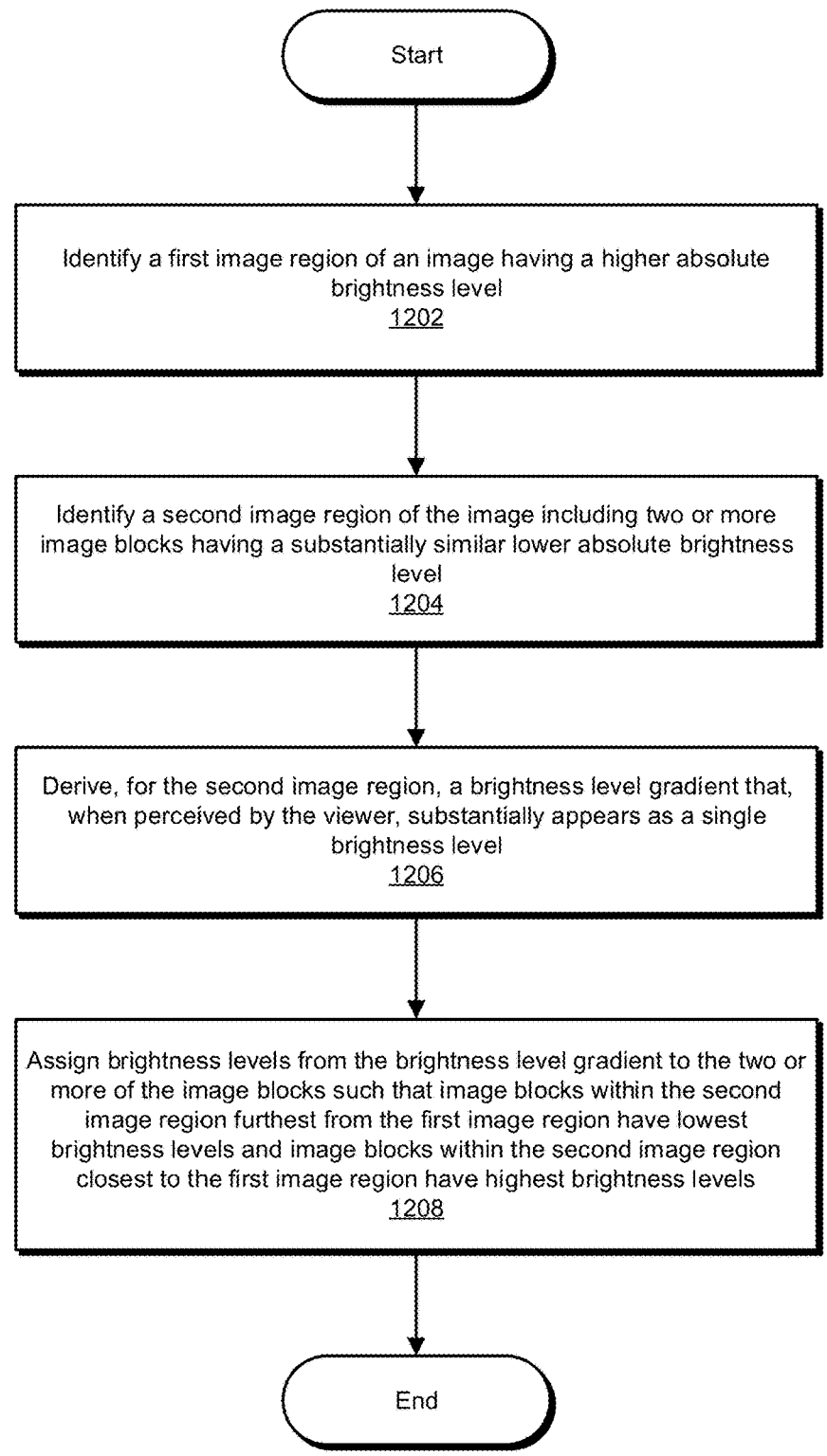
FIG. 12 is a flow diagram of an exemplary method for deriving relative brightness levels in accordance with some embodiments.
Figure 13A:
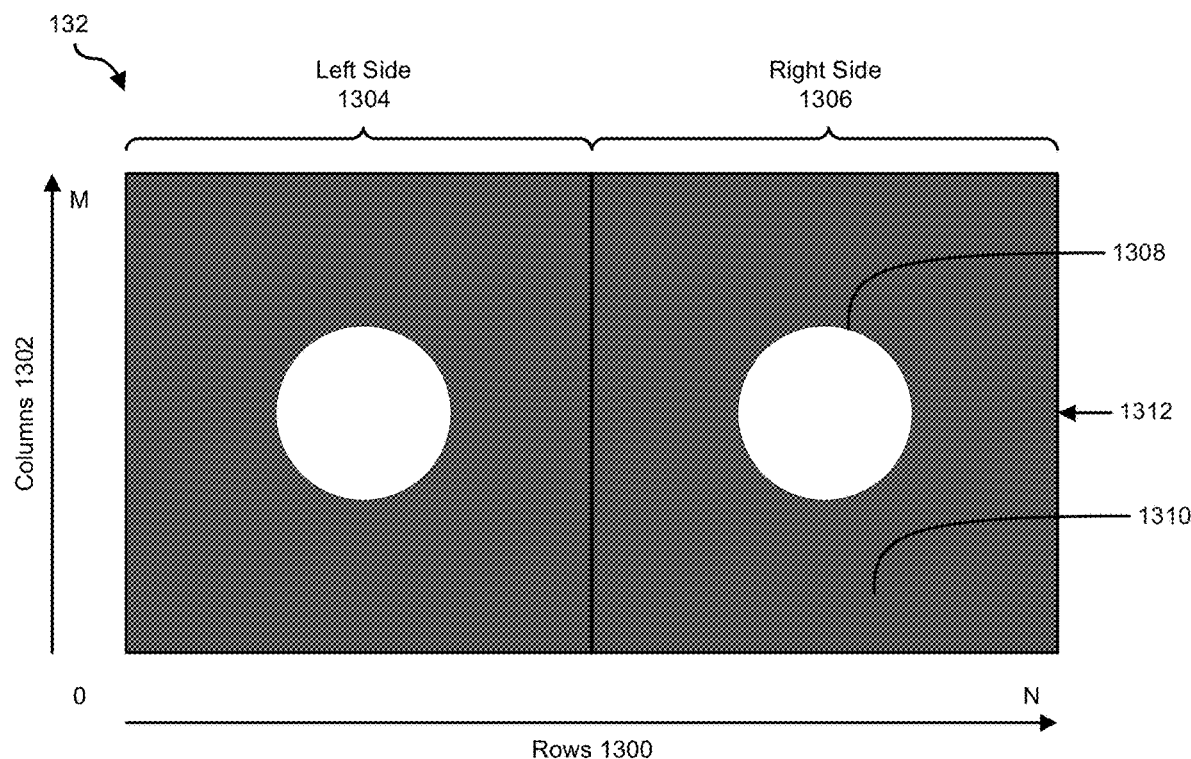
FIG. 13A is a front view of an additional exemplary image in accordance with some embodiments.
Figure 13B:
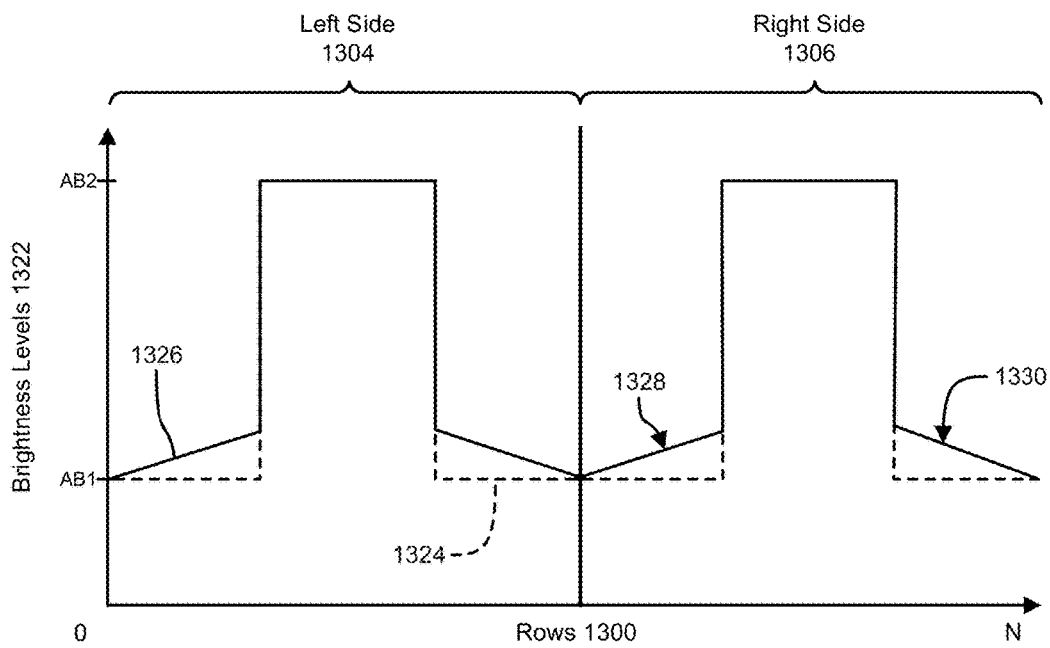
FIG. 13B is a diagram of exemplary absolute and relative brightness levels corresponding to the additional exemplary image illustrated in FIG. 13A in accordance with some embodiments.

FIG. 12 illustrates an exemplary method for deriving relative brightness levels for pixels of image 132 illustrated in FIG. 13A. In this example, image 132 may include M pixel columns 1302 and N pixel rows 1300. Image 132 may also include a left side 1304 for display via left side 104 of LC panel 102 and a right side 1306 for display via right side 106 of LC panel 102. As shown in FIG. 12, at step 1202, the apparatus or systems described herein may identify a first image region of an image having a higher absolute brightness level. For example, deriving module 124 may identify image region 1308 of image 132 illustrated in FIG. 13A that includes pixels having an absolute brightness level equal to AB2 shown in FIG. 13B, which illustrates brightness levels 1322 of the pixels in column 1312 of image 132. In the example shown in FIG. 13B, line 1324 may represent the absolute brightness levels of the pixels in column 1312 of image 132, and line 1326 may represent derived relative brightness levels for the pixels in column 1312 of image 132.

At step 1204, the apparatus or systems described herein may identify a second image region of the image including two or more image blocks having a substantially similar lower absolute brightness level. For example, deriving module 124 may identify image region 1310 of image 132 illustrated in FIG. 13A that includes pixels having an absolute brightness level equal to AB1. At step 1206, the apparatus or systems described herein may derive, for the second image region, a brightness level gradient that, when perceived by a viewer, substantially appears as a single brightness level. For example, deriving module 124 may derive, for image region 1310, a brightness level gradient 1328 and a brightness level gradient 1330 that, when perceived by a viewer, substantially appears as brightness level AB1. At step 1208, the apparatus or systems described herein may assign brightness levels from the brightness level gradient to the two or more of the image blocks such that image blocks within the second image region furthest from the first image region have lowest brightness levels and image blocks within the second image region closest to the first image region have highest brightness levels. For example, deriving module 124 may assign brightness levels from brightness level gradients 1328 and 1330 to pixels along column 1312 corresponding to image region 1310 as shown such that pixels within image region 1310 furthest from image region 1308 have lowest brightness levels and pixels within image region 1310 closest to image region 1308 have highest brightness levels.

Figure 14:
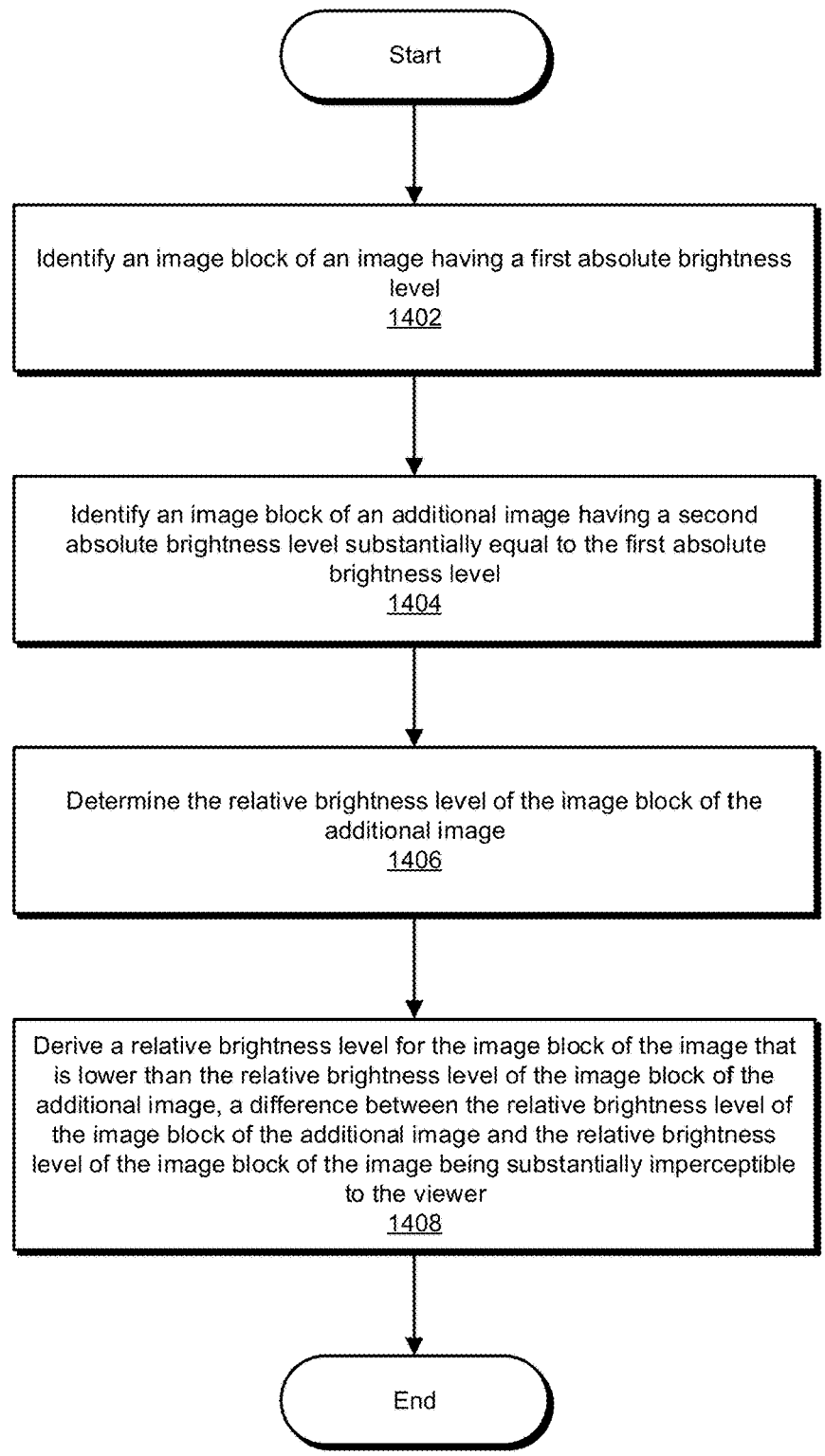
FIG. 14 is a flow diagram of an exemplary method for deriving relative brightness levels in accordance with some embodiments.
Figure 15A:
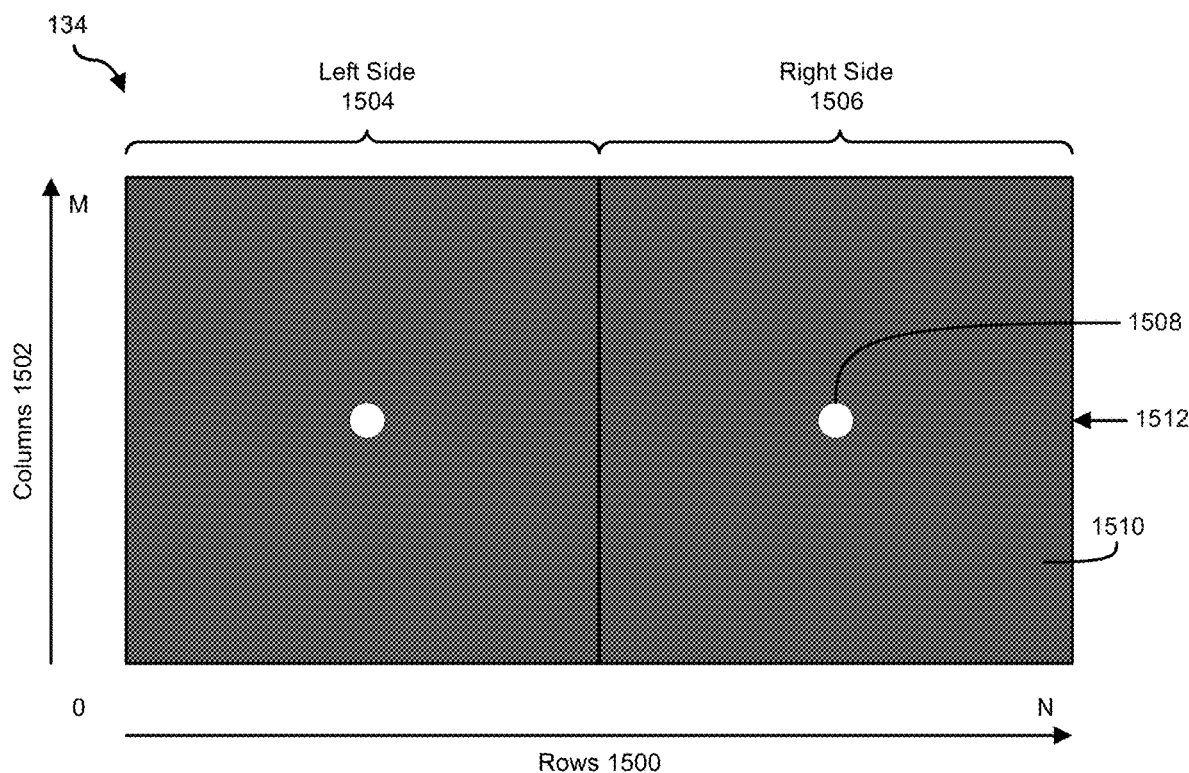
FIG. 15A is a front view of an additional exemplary image in accordance with some embodiments.
Figure 15B:
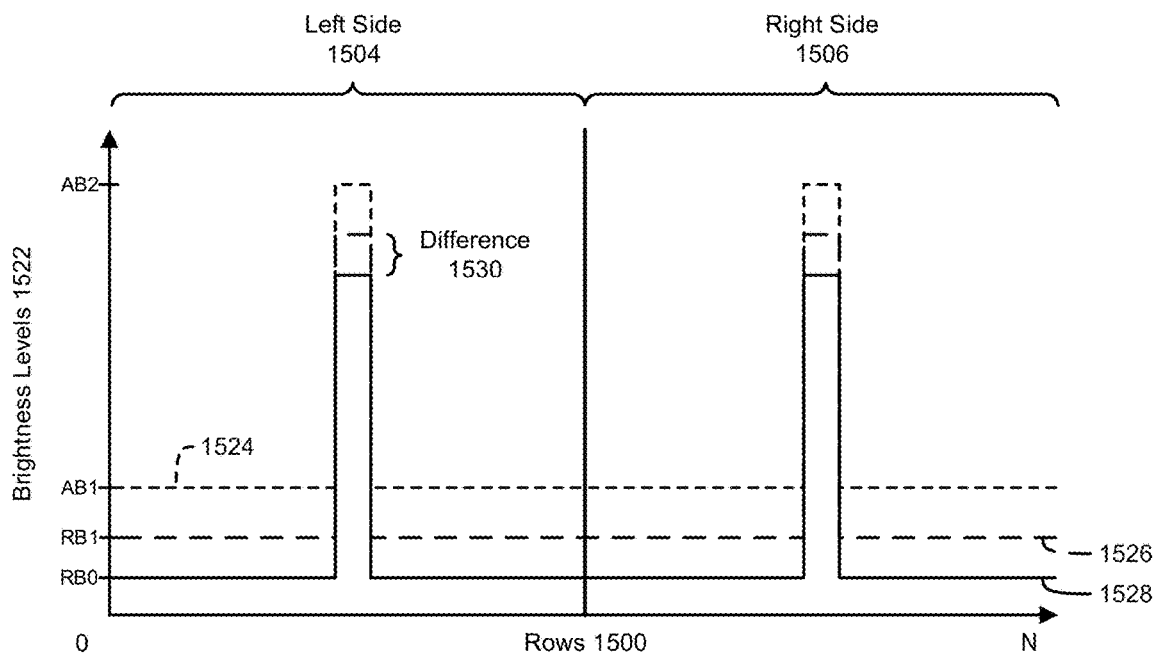
FIG. 15B is a diagram of exemplary absolute and relative brightness levels corresponding to the additional exemplary image illustrated in FIG. 15A in accordance with some embodiments.

FIG. 14 illustrates an exemplary method for deriving relative brightness levels for pixels of image 134, illustrated in FIG. 15A. In this example, image 134 may represent a subsequent image displayed via LC panel 102 that is substantially similar, at least in terms of absolute brightness levels, to image 132. Like image 132, image 134 may include M pixel columns 1502 and N pixel rows 1500 and may include a left side 1504 for display via left side 104 of LC panel 102 and a right side 1506 for display via right side 106 of LC panel 102. As shown in FIG. 14, at step 1402, the apparatus or systems described herein may identify an image block of an image having a first absolute brightness level. For example, deriving module 124 may identify a pixel within image region 1510 of image 134 illustrated in FIG. 15A having an absolute brightness level equal to AB1 shown in FIG. 15B, which illustrates brightness levels 1522 of the pixels in column 1512 of image 134. In the example shown in FIG. 15B, line 1524 may represent the absolute brightness levels of the pixels in column 1512 of image 134 and pixels in column 812 of image 132 in FIG. 8A, line 1526 may represent derived relative brightness levels for the pixels in column 812 of image 132, and line 1528 may represent derived relative brightness levels for the pixels in column 1512 of image 134.

At step 1404, the apparatus or systems described herein may identify an image block of an additional image having a second absolute brightness level substantially equal to the first absolute brightness level. For example, deriving module 124 may identify a pixel within image region 810 of image 132 illustrated in FIG. 8A having an absolute brightness level equal to AB1 shown in FIG. 8B. At step 1406, the apparatus or systems described herein may determine the relative brightness level of the image block of the additional image. For example, deriving module 124 may determine that the relative brightness for the pixel within image region 810 of image 132 illustrated in FIG. 8A is equal to RB1 shown in FIG. 8B.

At step 1408, the apparatus or systems described herein may derive a relative brightness level for the image block of the image that is lower than the relative brightness level of the image block of the additional image such that a difference between the relative brightness level of the image block of the additional image and the relative brightness level of the image block of the image is substantially imperceptible to the viewer. For example, deriving module 124 may derive a relative brightness level equal to RB0 for the pixels within image region 1510 of image 134 illustrated in FIG. 15A such that a difference 1530 between RB1 and RB0 is substantially imperceptible to the viewer of image 134.

Returning to FIG. 6 at step 608, one or more of the apparatus or systems described herein may calculate, for each luminous element of a backlight of the display panel, an illumination level based on the relative brightness level of a corresponding portion of the image blocks of the image. For example, calculating module 126 may, as part of backlight driver 120, calculate an illumination level for luminous element 504 of BLU 108 based on the relative brightness levels of portion 508 of image 132. In some examples, the calculated illumination levels may be derived from the corrected image described above.

In some examples, one or more of the apparatus or systems described herein may include a display device configured to present an evolving three-dimensional virtual scene to a user. In these examples, the apparatus or systems described herein may, in addition to or as an alternative to calculating illumination levels based on relative brightness levels, calculate illumination levels based on motions of the display device, motions of a head pose of a user relative to the evolving three-dimensional virtual scene, motions of the user's gaze, and/or motions of one or more of the elements in the evolving three-dimensional virtual scene. In some examples, movements of a display device that displays an evolving three-dimensional virtual scene, movements of the head pose of a user relative to the evolving three-dimensional virtual scene, movements of a user's gaze, and/or movements of the elements in the evolving three-dimensional virtual scene (which may be detectable using derived 2D motion vectors and/or depth map information) may cause predictable movements of one or more of the elements in the images portraying the evolving three-dimensional virtual scene. As such, one or more of the apparatus or systems described herein may predict movements of one or more of the elements in the images portraying the evolving three-dimensional virtual scene in order to correctly calculate illumination levels for illuminating these elements in the current image or in subsequent images. For example, the apparatus or systems described herein may use eye and object motion knowledge to predict the position of light regions in a subsequent image (N+1) more accurately in order to yield a more precise/aggressive LED+LCD adjustment. In at least one example, by considering movements within the images displayed via a display device, the apparatus or systems described herein may calculate illumination levels in ways that reduce or eliminate temporal backlighting artifacts that would otherwise be caused by the movements (e.g., a ghosting trail caused by a quickly moving bright object).

At step 610, one or more of the apparatus or systems described herein may illuminate, while the image is displayed via the display panel, each of the backlight array's luminous elements according to the illumination level calculated for the luminous element. For example, illuminating module 128 may, as part of backlight driver 120, illuminate, while image 132 is displayed via LC panel 102, each of luminous elements 504 according to the illumination level calculated at step 608. In some examples, a backlight array may have far fewer luminous elements than the number of image blocks of the images that it illuminates. As such, each of the backlight array's luminous elements, which may have a single illumination level, may need to illuminate multiple image blocks of an image that each have a different brightness level. For at least this reason, one or more of the apparatus or systems described herein may compensate for these differences before displaying and illuminating an image. For example, one or more of the apparatus or systems described herein may transform the corrected image described above into a final image ready to be displayed and backlit by determining an image that, when illuminated according to the illumination levels calculated above, will produce an optical density field equivalent to an optical density field of the corrected image if illuminated by a uniformly illuminated backlight array.

In some examples, one or more of the apparatus or systems described herein may include a display device configured to present images portraying an evolving three-dimensional virtual scene to a user. In such examples, movements of the display device, movements of the head pose of a user relative to the evolving three-dimensional virtual scene, movements of a user's gaze, and/or movements of the elements in the evolving three-dimensional virtual scene may cause predictable movements of one or more of the elements in the images. As such, one or more of the apparatus or systems described herein may transform the images (or corrected images) into a final image ready to be displayed and backlit by predicting the movements of one or more of the elements in the images portraying the evolving three-dimensional virtual scene in order to compensate for the motions of the elements. In at least one example, by considering movements within the images displayed via a display device, the apparatus or systems described herein may transform the images in ways that reduce or eliminate temporal backlighting artifacts that would otherwise be caused by the movements (e.g., a ghosting trail caused by a quickly moving bright object).

Figure 16:
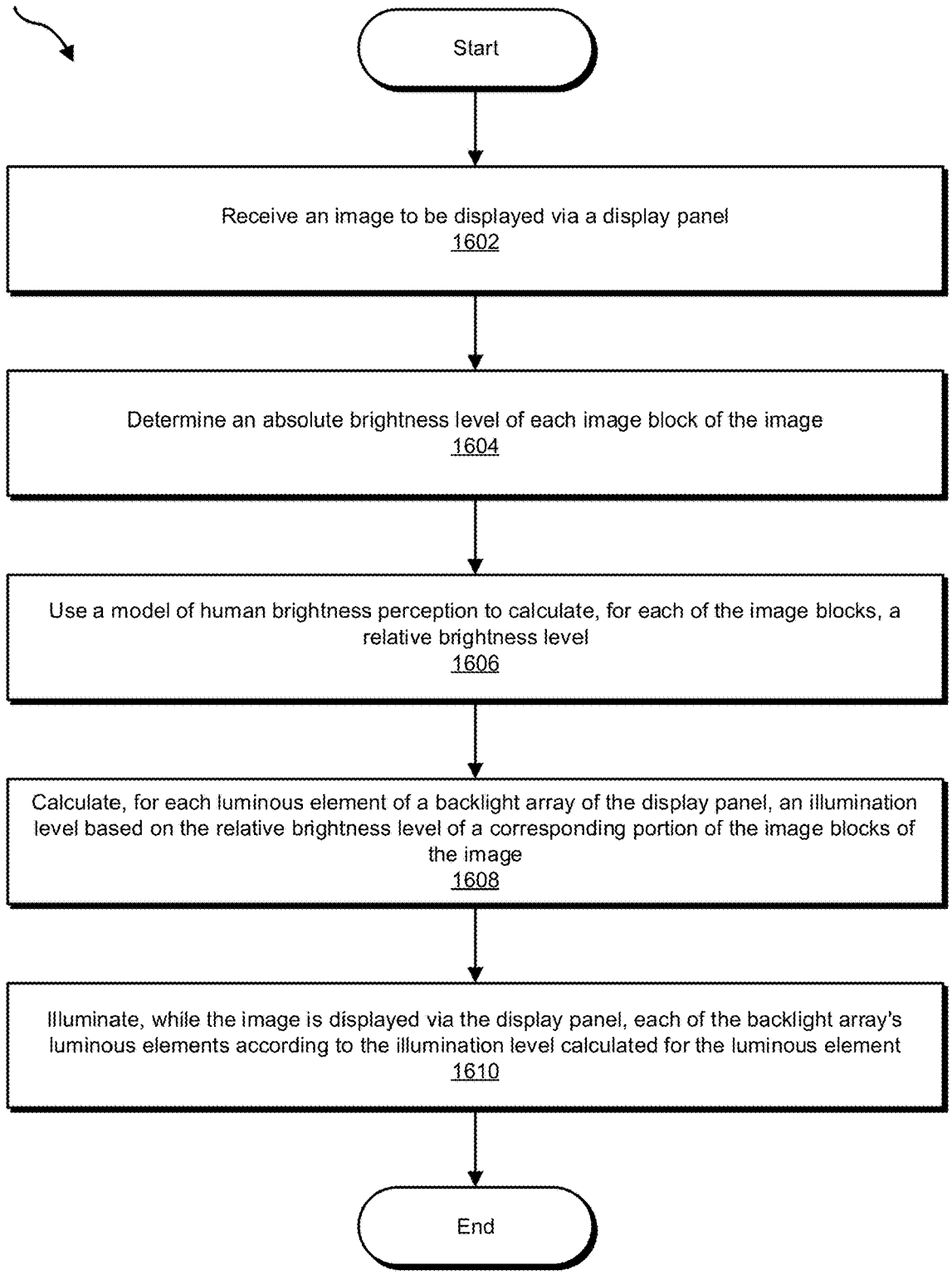
FIG. 16 is a flow diagram of an additional exemplary method for performing local dimming of backlights in brightness-controlled environments in accordance with some embodiments.

FIG. 16 is a flow diagram of an example computer-implemented method 1600 for performing local dimming of backlights in brightness-controlled environments. The steps shown in FIG. 16 may be performed by any suitable computer-executable code and/or computing system, including display system 100 in FIG. 1, head-mounted-display device 202 in FIG. 2, and/or variations or combinations of one or more of the same. In one example, each of the steps shown in FIG. 16 may represent an algorithm whose structure includes and/or is represented by multiple sub-steps, examples of which will be provided in greater detail below.

As illustrated in FIG. 16, at step 1602, one or more of the apparatus or systems described herein may receive an image to be displayed via a display panel. For example, receiving module 116 may, as part of display driver 114, receive image 132 to be displayed via LC panel 102. At step 1604, one or more of the apparatus or systems described herein may determine an absolute brightness level of each image block of the image. For example, determining module 122 may, as part of backlight driver 120, determine an absolute brightness level of each image block of image 132.

At step 1606, one or more of the apparatus or systems described herein may use a model of human brightness perception to calculate, for each of the image blocks, a relative brightness level. For example, deriving module 124 may, as part of backlight driver 120, use perception model 130 to derive, for each image block of image 132, a relative brightness level. In some examples, the term "model of human brightness perception" may refer to any algorithm, heuristic, data, or combination thereof, that may be used to calculate relative brightness levels for image blocks of an image based of the absolute brightness levels or the relative brightness levels of the image blocks of the image or the absolute brightness levels or the relative brightness levels of image blocks of a previously displayed image. In some examples, one or more of the apparatus or systems described herein may empirically create a model of human brightness perception by comparing two sets of images that one or more users were unable to tell the difference between (e.g., when observed in a closed environment without seeing other external objects). Additionally or alternatively, one or more of the apparatus or systems described herein may create a model of human brightness perception based on scientific observations about human eye and/or brain biology (e.g., observations regarding how the human vision system may be insensitive to or able to compensate for a wide range of brightness gradients on bright objects).

In some examples, one or more of the apparatus or systems described herein may train a model of human brightness perception to model or predict how a viewer perceives luminosity gradients. In these examples, one or more of the apparatus or systems described herein may use the model to derive the brightness level gradients described above that, when perceived by the viewer, substantially appears as a single brightness level. Additionally or alternatively, one or more of the apparatus or systems described herein may train a model of human brightness perception to model or predict how a viewer perceives absolute brightness levels based on reference brightness levels. In some examples, one or more of the apparatus or systems described herein may use the model to derive the differences between brightness levels described above that are substantially imperceptible to a viewer.

At step 1608, one or more of the apparatus or systems described herein may calculate, for each luminous element of a backlight of the display panel, an illumination level based on the relative brightness level of a corresponding portion of the image blocks of the image. For example, calculating module 126 may, as part of backlight driver 120, calculate an illumination level for luminous element 504 of BLU 108 based on the relative brightness levels of corresponding portion 508 of image 132. At step 1610, one or more of the apparatus or systems described herein may illuminate, while the image is displayed via the display panel, each of the backlight array's luminous elements according to the illumination level calculated for the luminous element. For example, illuminating module 128 may, as part of backlight driver 120, illuminate, while image 132 is displayed via LC panel 102, each of luminous elements 504 according to the illumination level calculated at step 1608.

As discussed throughout the instant disclosure, the disclosed apparatuses, systems, and methods may provide one or more advantages over traditional display apparatuses, systems, and methods. For example, embodiments of the instant disclosure may reduce or eliminate many of the visual defects found in LCDs that implement conventional local backlighting techniques. Moreover, the disclosed local backlight dimming techniques may enable comfortable observation of fast-moving objects or bright objects on a dark background, reduce power consumption of VR displays, and/or significantly increase the perceived contrast of VR scenes.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an image to be displayed via a LC panel, transform the image into illumination levels for luminous elements of the LC panel's backlight array, output a result of the transformation to the backlight array of the LC panel, and use the result of the transformation to illuminate the image while the image is displayed via the LC panel. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a head-mounted display device, an image comprising a plurality of image blocks, wherein:
      the image is to be displayed via a display panel of the head-mounted display device comprising a plurality of pixel regions;
      a backlight array of the head-mounted display device is coupled to the display panel behind the plurality of pixel regions and comprises a plurality of luminous elements that each illuminate a corresponding portion of the plurality of pixel regions; and
      a display housing of the head-mounted display device substantially prevents a viewer from seeing ambient brightness levels of the viewer's surroundings;
   determining, at the head-mounted display device, an absolute brightness level of each of the plurality of image blocks;
   deriving, at the head-mounted display device for each of the plurality of image blocks, a relative brightness level based on an internal reference brightness level instead of an ambient brightness level of the viewer's surroundings;
   calculating, at the head-mounted display device for each of the plurality of luminous elements, an illumination level based at least in part on the relative brightness level of a corresponding portion of the plurality of image blocks; and
   illuminating, at the head-mounted display device while displaying the image via the display panel, each of the plurality of luminous elements according to the illumination level calculated for the luminous element.

2. The computer-implemented method of claim 1, wherein the internal reference brightness level comprises at least one of the absolute brightness level or the relative brightness level of another one of the plurality of image blocks.

3. The computer-implemented method of claim 2, wherein deriving the relative brightness level for each of the plurality of image blocks comprises:
   identifying a first image region of the image comprising one or more of the plurality of image blocks having a lower absolute brightness level;
   identifying a second image region of the image comprising one or more of the plurality of image blocks having a higher absolute brightness level;
   calculating a difference between the lower absolute brightness level and the higher absolute brightness level;
   deriving, for each of the plurality of image blocks in the first region, a first relative brightness level that is lower than the lower absolute brightness level; and deriving, for each of the plurality of image blocks in the second region, a second relative brightness level that is substantially equal to a sum of the first relative brightness level and the difference.

4. The computer-implemented method of claim 2, wherein deriving the relative brightness level for each of the plurality of image blocks comprises:
identifying a first image region of the image having a lower absolute brightness level;
identifying a second image region of the image comprising two or more of the plurality of image blocks having a substantially similar higher absolute brightness level;
deriving, for the second image region, a brightness level gradient that, when perceived by the viewer, substantially appears as a single brightness level; and
assigning brightness levels from the brightness level gradient to the two or more of the plurality of image blocks such that image blocks within the second image region furthest from the first image region have highest brightness levels and image blocks within the second image region closest to the first image region have lowest brightness levels.

5. The computer-implemented method of claim 2, wherein deriving the relative brightness level for each of the plurality of image blocks comprises:
identifying a first image region of the image having a higher absolute brightness level;
identifying a second image region of the image comprising two or more of the plurality of image blocks having a substantially similar lower absolute brightness level;
deriving, for the second image region, a brightness level gradient that, when perceived by the viewer, substantially appears as a single brightness level; and
assigning brightness levels from the brightness level gradient to the two or more of the plurality of image blocks such that image blocks within the second image region furthest from the first image region have lowest brightness levels and image blocks within the second image region closest to the first image region have highest brightness levels.

6. The computer-implemented method of claim 1, wherein the internal reference brightness level comprises at least one of an absolute brightness level or a relative brightness level of an image block of an additional image previously displayed via the display panel.

7. The computer-implemented method of claim 6, wherein deriving the relative brightness level for each of the plurality of image blocks comprises:
identifying at least one image block of the image having a first absolute brightness level;
identifying at least one image block of the additional image having a second absolute brightness level substantially equal to the first absolute brightness level;
determining the relative brightness level of the at least one image block of the additional image; and
deriving a relative brightness level for the at least one image block of the image that is lower than the relative brightness level of the at least one image block of the additional image, a difference between the relative brightness level of the at least one image block of the additional image and the relative brightness level of the at least one image block of the image being substantially imperceptible to the viewer.

8. The computer-implemented method of claim 1, wherein the image conveys an evolving three-dimensional virtual scene to the viewer.

9. A computer-implemented method comprising:
receiving, at a head-mounted display device, an image comprising a plurality of image blocks, wherein:
the image is to be displayed via a display panel of the head-mounted display device comprising a plurality of pixel regions;
a backlight array of the head-mounted display device is coupled to the display panel behind the plurality of pixel regions and comprises a plurality of luminous elements that each illuminate a corresponding portion of the plurality of pixel regions; and
a display housing of the head-mounted display device substantially prevents a viewer from seeing ambient brightness levels of the viewer's surroundings;
determining, at the head-mounted display device, an absolute brightness level of each of the plurality of image blocks;
using, at the head-mounted display device, a model of human brightness perception to calculate, for each of the plurality of image blocks, a relative brightness level based on an internal reference brightness level instead of an ambient brightness level of the viewer's surroundings, the internal reference brightness level comprising at least one of:
the absolute brightness level or the relative brightness level of another one of the plurality of image blocks; or
an absolute brightness level or a relative brightness level of an image block of an additional image previously displayed via the display panel;
calculating, at the head-mounted display device for each of the plurality of luminous elements, an illumination level based at least in part on the relative brightness level of a corresponding portion of the plurality of image blocks; and
illuminating, at the head-mounted display device while displaying the image via the display panel, each of the plurality of luminous elements according to the illumination level calculated for the luminous element.

10. The computer-implemented method of claim 9, wherein the model of human brightness perception predicts how the viewer perceives luminosity gradients when the viewer cannot compare the internal reference brightness level to the ambient brightness levels of the viewer's surroundings.

11. The computer-implemented method of claim 9, wherein the model of human brightness perception predicts how the viewer perceives absolute brightness levels when the viewer cannot compare the internal reference brightness level to the ambient brightness levels of the viewer's surroundings.

12. The computer-implemented method of claim 9, wherein the relative brightness level of at least one of the plurality of image blocks is calculated based on at least one of the absolute brightness level or the relative brightness level of the other one of the plurality of image blocks.

13. The computer-implemented method of claim 12, wherein using the model of human brightness perception to calculate the relative brightness level for each of the plurality of image blocks comprises:
identifying a first image region of the image comprising one or more of the plurality of image blocks having a lower absolute brightness level;
identifying a second image region of the image comprising one or more of the plurality of image blocks having a higher absolute brightness level;

calculating a difference between the lower absolute brightness level and the higher absolute brightness level;
using the model of human brightness perception to derive, for each of the plurality of image blocks in the first region, a first relative brightness level that is lower than the lower absolute brightness level; and
deriving, for each of the plurality of image blocks in the second region, a second relative brightness level that is substantially equal to a sum of the first relative brightness level and the difference.

14. The computer-implemented method of claim 12, wherein using the model of human brightness perception to calculate the relative brightness level for each of the plurality of image blocks comprises:
identifying a first image region of the image having a lower absolute brightness level;
identifying a second image region of the image comprising two or more of the plurality of image blocks having a substantially similar higher absolute brightness level;
using the model of human brightness perception to derive, for the second image region, a brightness level gradient that, when perceived by the viewer, substantially appears as a single brightness level; and
assigning brightness levels from the brightness level gradient to the two or more of the plurality of image blocks such that image blocks within the second image region furthest from the first image region have highest brightness levels and image blocks within the second image region closest to the first image region have lowest brightness levels.

15. The computer-implemented method of claim 12, wherein using the model of human brightness perception to calculate the relative brightness level for each of the plurality of image blocks comprises:
identifying a first image region of the image having a higher absolute brightness level;
identifying a second image region of the image comprising two or more of the plurality of image blocks having a substantially similar lower absolute brightness level;
using the model of human brightness perception to derive, for the second image region, a brightness level gradient that, when perceived by the viewer, substantially appears as a single brightness level; and
assigning brightness levels from the brightness level gradient to the two or more of the plurality of image blocks such that image blocks within the second image region furthest from the first image region have lowest brightness levels and image blocks within the second image region closest to the first image region have highest brightness levels.

16. The computer-implemented method of claim 9, wherein the relative brightness level of at least one of the plurality of image blocks is calculated based on at least one of the absolute brightness level or the relative brightness level of the image block of the additional image previously displayed via the display panel.

17. The computer-implemented method of claim 16, wherein deriving the relative brightness level for each of the plurality of image blocks comprises:
identifying at least one image block of the image having a first absolute brightness level;
identifying at least one image block of the additional image having a second absolute brightness level substantially equal to the first absolute brightness level;
determining the relative brightness level of the at least one image block of the additional image; and
using the model of human brightness perception to derive a relative brightness level for the at least one image block of the image that is lower than the relative brightness level of the at least one image block of the additional image, a difference between the relative brightness level of the at least one image block of the additional image and the relative brightness level of the at least one image block of the image being substantially imperceptible to the viewer.

18. A head-mounted display device comprising:
a display panel comprising a plurality of pixel regions;
a backlight array coupled to the display panel behind the plurality of pixel regions, the backlight array comprising a plurality of luminous elements that each illuminate a corresponding one of the plurality of pixel regions;
a display housing that substantially prevents a user from seeing ambient brightness levels;
a display driver configured to:
receive an image comprising a plurality of image blocks; and
scan the image to the display panel; and
a backlight driver configured to:
determine an absolute brightness level of each of the plurality of image blocks;
derive, for each of the plurality of image blocks, a relative brightness level based on an internal reference brightness level instead of an ambient brightness level of the user's surroundings, the internal reference brightness level comprising at least one of:
the absolute brightness level or the relative brightness level of another one of the plurality of image blocks; or
an absolute brightness level or a relative brightness level of an image block of an additional image previously displayed via the display panel;
calculate, for each of the plurality of luminous elements, an illumination level based at least in part on the relative brightness level of a corresponding portion of the plurality of image blocks; and
illuminate, while the image is displayed via the display panel, each of the plurality of luminous elements according to the illumination level calculated for the luminous element.

19. The display device of claim 18, wherein:
the head-mounted display device is configured to present an evolving three-dimensional virtual scene to the user;
the image depicts a plurality of elements in the evolving three-dimensional virtual scene; and
the backlight driver is further configured to:
determine a motion of at least one of:
the display device;
a head pose of the user relative to the evolving three-dimensional virtual scene;
a gaze of the user; or
one or more of the plurality of elements; and
calculate the illumination level for each of the plurality of luminous elements based at least in part on the motion.

20. The display device of claim 18, wherein:
the head-mounted display device is configured to present an evolving three-dimensional virtual scene to the user;
the image depicts a plurality of elements in the evolving three-dimensional virtual scene; and
the backlight driver is further configured to:
determine a motion of at least one of:
the display device;
a head pose of the user relative to the evolving three-dimensional virtual scene;
a gaze of the user; or
one or more of the plurality of elements; and adjust the image to compensate for the motion before displaying the image to the user via the display panel.

* * * * *